US009317937B2

(12) United States Patent
Le

(10) Patent No.: US 9,317,937 B2
(45) Date of Patent: Apr. 19, 2016

(54) RECOGNITION OF USER DRAWN GRAPHICAL OBJECTS BASED ON DETECTED REGIONS WITHIN A COORDINATE-PLANE

(71) Applicant: Skribb.it Inc., Los Gatos, CA (US)

(72) Inventor: Vietlong Le, Los Gatos, CA (US)

(73) Assignee: SKRIBB.IT INC., Los Gatos, CA (US)

( * ) Notice: Subject to any disclaimer, the term of this patent is extended or adjusted under 35 U.S.C. 154(b) by 0 days.

(21) Appl. No.: 14/586,168

(22) Filed: Dec. 30, 2014

(65) Prior Publication Data
US 2015/0205398 A1    Jul. 23, 2015

Related U.S. Application Data

(60) Provisional application No. 61/921,834, filed on Dec. 30, 2013.

(51) Int. Cl.
| | |
|---|---|
| *G06F 3/01* | (2006.01) |
| *G06F 3/041* | (2006.01) |
| *G06F 3/0488* | (2013.01) |
| *G06F 9/44* | (2006.01) |
| *G06T 7/60* | (2006.01) |
| *G06T 11/80* | (2006.01) |
| *G06T 11/00* | (2006.01) |

(52) U.S. Cl.
CPC ............ *G06T 11/00* (2013.01); *G06F 3/04883* (2013.01); *G06F 3/017* (2013.01); *G06F 3/041* (2013.01); *G06F 3/0488* (2013.01); *G06F 9/4443* (2013.01); *G06F 2203/04806* (2013.01); *G06T 7/602* (2013.01); *G06T 7/608* (2013.01); *G06T 11/80* (2013.01)

(58) Field of Classification Search
CPC ....... G06F 3/017; G06F 3/041; G06F 3/0488; G06F 9/4443; G06T 7/602; G06T 7/608; G06T 11/80
See application file for complete search history.

(56) References Cited

U.S. PATENT DOCUMENTS

| 5,121,442 | A | * | 6/1992 | Togawa et al. ................. 382/189 |
|---|---|---|---|---|
| 5,452,371 | A | * | 9/1995 | Bozinovic et al. ............. 382/187 |
| 5,553,224 | A | * | 9/1996 | Saund et al. ................... 345/619 |
| 5,764,936 | A | * | 6/1998 | Evans et al. ................... 715/861 |
| 6,459,442 | B1 | * | 10/2002 | Edwards et al. ............... 715/863 |
| 7,797,354 | B2 | * | 9/2010 | Sattler et al. .................. 707/809 |

(Continued)

OTHER PUBLICATIONS

Weisstein, Eric W., "Trapezium," Mathworld, Oct. 23, 2013, http://mathworld.wolfram.com/Trapezuim.html, and retrieved on Jul. 9, 2015, from the Internet Archive.*

*Primary Examiner* — Eric J Bycer
(74) *Attorney, Agent, or Firm* — K&L Gates LLP

(57) ABSTRACT

A system, method, and apparatus for managing the drawing of graphical objects are disclosed. An example apparatus includes a touchscreen interface configured to receive at least one gesture from a user on a touchscreen of a client device. The apparatus also includes a coordinate detector configured to determine a coordinate-plane for the at least one gesture and determine coordinates of points along the at least one gesture. The apparatus further includes an object detector configured to determine a graphical object based on the coordinates of points corresponding to the at least one gesture and an object manager configured to cause the graphical object to be displayed by the client device. The graphical object includes a formalized editable version of the at least one gesture in a format native to an application selected to receive the graphical object.

23 Claims, 21 Drawing Sheets

(56) References Cited

U.S. PATENT DOCUMENTS

| | | | |
|---|---|---|---|
| 2002/0109677 A1* | 8/2002 | Taylor | 345/173 |
| 2002/0141643 A1* | 10/2002 | Jaeger | 382/181 |
| 2005/0063592 A1* | 3/2005 | Li et al. | 382/181 |
| 2008/0231635 A1* | 9/2008 | Saund | 345/440 |
| 2008/0281573 A1* | 11/2008 | Seletsky et al. | 703/17 |
| 2009/0051671 A1* | 2/2009 | Konstas | 345/174 |
| 2009/0085933 A1* | 4/2009 | Chen et al. | 345/650 |
| 2009/0089651 A1* | 4/2009 | Herberger et al. | 715/202 |
| 2009/0100383 A1* | 4/2009 | Sunday et al. | 715/863 |
| 2009/0128516 A1* | 5/2009 | Rimon et al. | 345/174 |
| 2012/0151421 A1* | 6/2012 | Clarkson | 715/863 |
| 2012/0169772 A1* | 7/2012 | Werner et al. | 345/660 |
| 2012/0256926 A1* | 10/2012 | Jimenez et al. | 345/440 |
| 2013/0191768 A1* | 7/2013 | Thompson et al. | 715/765 |
| 2013/0326377 A1* | 12/2013 | Yu et al. | 715/763 |

\* cited by examiner

| Object | # Moat Regions | Size Ratio | Other Properties |
|---|---|---|---|
| Square | 4 | > 90% | |
| Rectangle | 4 | < 90% | |
| U-Shape | 3 | | Not a Triangle |
| L-Shape | 2 | | |
| Triangle | 2 | | Third Side Through Coordinate-Plane |
| Triangle | 1 | | Two Sides Through Coordinate-Plane Variation from apex to corner < 10 pixels |
| Line | 1 | | No additional sides |
| Circle | 0 | > 90% | |
| Ellipse | 0 | < 10% | |

RECOGNITION OF USER DRAWN GRAPHICAL OBJECTS BASED ON DETECTED REGIONS WITHIN A COORDINATE-PLANE

PRIORITY CLAIM

The present application claims priority to and the benefit of U.S. Provisional Patent Application Ser. No. 61/921,834, filed on Dec. 30, 2013, the entirety of which is incorporated herein by reference.

BACKGROUND

At the end of a meeting, a relatively junior level consultant was tasked with documenting the writing on a whiteboard before it was erased. The writing on the whiteboard included a new process flow created by a consulting team that comprised numerous graphical shapes, lines connecting the shapes, and corresponding text. The consultant, using a touchscreen tablet, attempted to hand-draw each of the shapes, the connectors between the shapes, and the corresponding text. Despite the consultant's best efforts, the hand-drawn reproduction was not legible. The line segments forming each of the shapes were uneven, broken, or otherwise unreadable. The connectors were positioned incorrectly. The text was not aligned with the proper shape or connector. The consulting team later reviewed the consultant's reproduction. However, to the team's horror, most of the information created on the whiteboard was not accurately captured using the touchscreen tablet. Members of the team had to painstakingly recreate the new process flow from memory, consuming time that could have been spent on other tasks.

At the end of another meeting, the junior consultant remembered his past mistake and decided instead to take a photo of the whiteboard. While the photo quality was decent, the consulting team could not edit or search the information recorded in the photo. The junior consultant later found himself again painstakingly recreating the information in an editable text version. The same junior consultant was also tasked with recreating other unsearchable/unmodifiable process flows created by the team members. These other process flows had been hand drawn on paper and stored physically or electronically.

Unfortunately, the above incidents reflect a common trend among the increased use of tablets, smartphones, and other computing devices that have cameras and touch-sensitive screens. Oftentimes, users attempt to use the camera to record/scan an image of a figure or use the touchscreen to draw shapes and other objects, even when default shapes are available in a program (e.g., a word processing program). Selecting default shapes is generally time-consuming because each shape has to be properly sized, positioned, colored, etc. Instead, users would rather hand-draw these shapes or photograph the entire figure to save time. However, it is generally difficult for users to draw straight lines, complete shapes, make connections, etc., especially on relatively low friction touch-sensitive devices. The difficulty is further compounded by the size of a user's fingers relative to the size of shapes to be drawn and the accuracy of touchscreen sensors. Moreover, known software applications that record shapes drawn by users may export these shapes to other programs as a static image (e.g., an image with a JPG or PNG extension). These static images, including images recorded by a camera, are not searchable or modifiable.

SUMMARY

The present disclosure addresses some of the above described issues with drawing shapes (e.g., graphical objects that include shapes, lines, arrows, text, images, charts, tables, figures, etc.) on a touchscreen by providing a new and innovative system, method, and apparatus for managing the creation, drawing, and/or use of graphical objects. A graphical object manager is configured to enable users to create/manage graphical objects based on a user's hand-drawn gestures on a touchscreen of a client device. The example graphical object manager assists a user in creating a graphical object by determining which object a user is attempting to draw (e.g., detection of a rectangle) and outputs a formalized digital version of the object. The graphical object manager may also predict which graphical object a user is beginning to draw (e.g., determine a user is starting to draw a circle). The graphical object manager is further configured to manage graphical objects by enabling a user to modify, store, search, export, and share graphical objects. The graphical object manager may be implemented within an application on a client device or be provided to users via a cloud-based service.

In an embodiment, an example graphical object manager includes a touchscreen interface configured to receive at least one gesture from a user on a touchscreen of a client device. The graphical object manager also includes a coordinate detector configured to determine a coordinate-plane for the at least one gesture and determine coordinates of points along the at least one gesture. The graphical object manager further includes an object detector configured to determine a graphical object based on the coordinates of points corresponding to the at least one gesture and an object manager configured to cause the graphical object to be displayed by the client device. The output graphical object includes a formalized editable version of the at least one gesture in a format native to an application selected to receive the graphical object.

In another embodiment, an example method includes prompting a user, via a processor, to draw an object on a touchscreen of a client device and receiving at least one gesture from the user on the touchscreen. The example method also includes applying, via the processor, a coordinate-plane to the at least one gesture, the coordinate-plane including at least two moat regions along a perimeter of the coordinate-plane. For each of the moat regions the processor is configured to (i) determine coordinates of points along the at least one gesture, (ii) determine whether a threshold number of the coordinates are within each of the moat regions, and (iii) designate each moat region as a detected moat region responsive to determining that the threshold number of coordinates is reached for the respective moat region. The example method further includes determining, via the processor, a graphical object based on a number of detected moat regions and causing, via the processor, the graphical object to be displayed by the client device.

Additional features and advantages of the disclosed system, method, and apparatus are described in, and will be apparent from, the following Detailed Description and the Figures.

DETAILED DESCRIPTION

Figure 1:
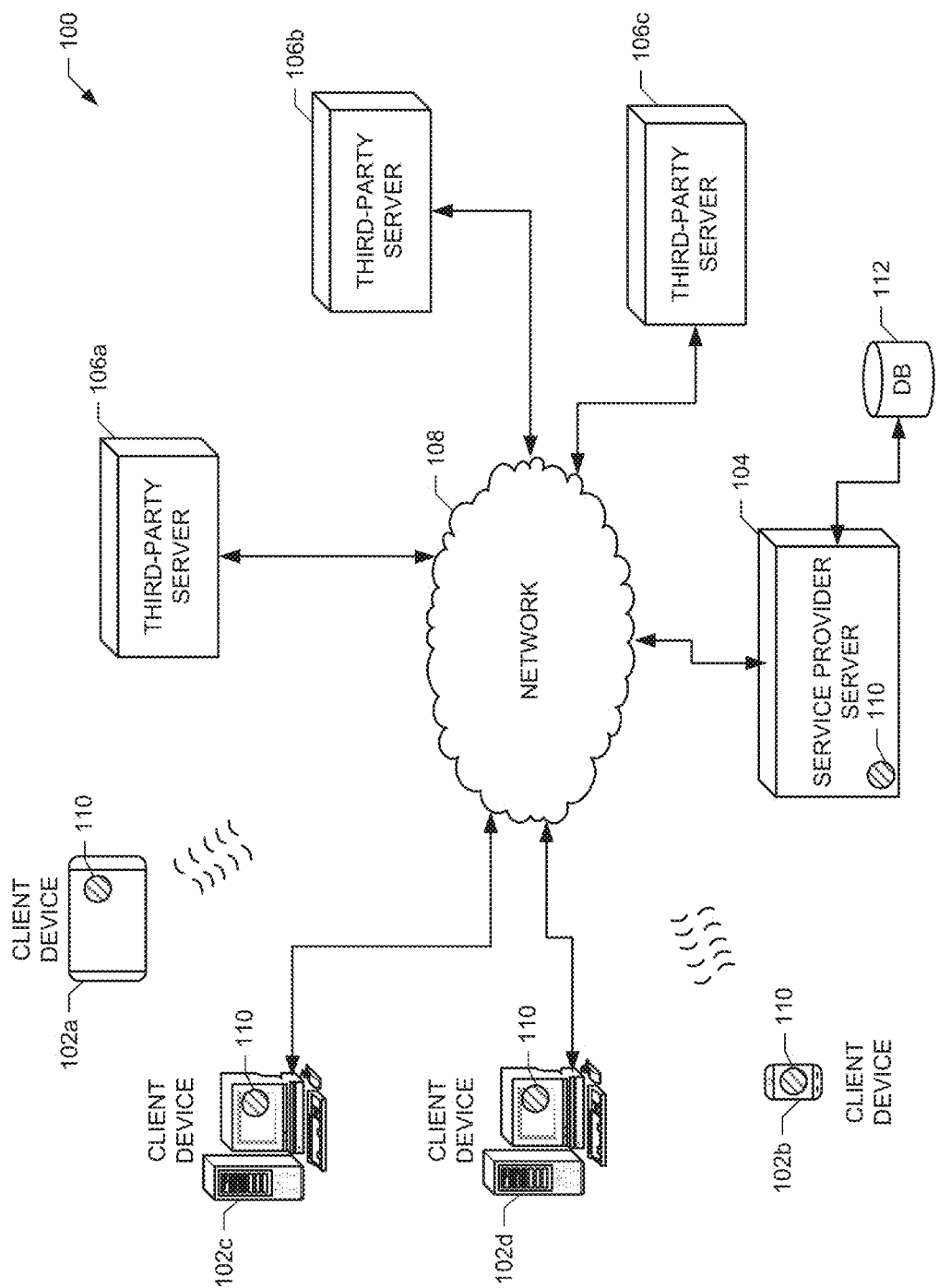
FIG. 1 shows a diagram of a graphical object environment including a graphical object manager, according to an example embodiment of the present disclosure.

The present disclosure relates in general to a method, system, and apparatus to manage the creation and export of graphical objects, and in particular, to providing a framework to detect, predict, modify, and/or export user-drawn graphical objects as one or more defined objects. As disclosed herein, a graphical object is a computer-displayable graphical element that includes for example, shapes, lines, arrows, text, images, charts, tables, figures, etc. For instance, graphical objects may include flow diagram shapes (e.g., squares, circles, decision boxes, connectors, text, etc.), process control shapes (e.g., valves, tanks, engines, sensors, etc.), building shapes (e.g., rooms, furniture, windows, roads, signs, etc.), electrical shapes (e.g., resistors, buses, capacitors, diodes, transistors, inductors, operational amplifiers, power sources, traces, etc.), and/or any other type of defined and/or standardized object.

A graphical object may appear as a two-dimensional object and/or three-dimensional object on a display screen of a client device. Additionally or alternatively, a graphical object may be displayed by a client device in a two-dimensional image and/or a three-dimensional image. Moreover, a graphical object may be created in a two-dimensional coordinate-plane of a touchscreen device and/or created in a three-dimensional coordinate-plane of a device capable or detecting such user-provided gestures.

As disclosed herein, a gesture is a series of inputs to a touchscreen device from a user. A user provides a gesture using a finger, stylus, mouse, or other input apparatus. A single gesture includes a start, an end, and points between. A user may provide individual gestures, which are analyzed by a graphical object manager to determine a graphical object. A user may also provide linked gestures (e.g., transitioning from one gesture to another gesture without lifting a finger from a touchscreen), which are partitioned by the example graphical object manager into individual gestures. The graphical object manager may be programmed with thresholds for partitioning gestures into separate line portions. The thresholds may include, for example, angle or curvature differences between adjacent coordinates and/or groups of coordinates associated with the gestures.

Gestures are disclosed herein as being two-dimensional on a touchscreen of a client device (e.g., gestures provided by a user's finger or stylus). However, it should be appreciated that the method, system, and apparatus may be applied to three-dimensional physical space. For example, the method, system, and apparatus may be configured to detect a gesture as a movement of a user's finger or hand in the space above a client device. Alternatively, the method, system, and apparatus may detect a gesture as a movement of a device (e.g., a wand, stylus, ring-like attachment to a user's finger, etc.). Moreover, the method, system, and apparatus may detect a gesture as a movement of a user's eye using, for example, smart-eyewear.

As discussed herein, gestures are recorded and displayed as formalized graphical objects on a touchscreen display of a client device. However, it should be appreciated that the method, system, and apparatus disclosed herein may also be applied to digitally enabled physical walls, digitally enabled whiteboards, and/or any other digitally enabled surface. The method, system, and apparatus may use any motion sensed by a movement detector to detect and record gestures. For example, a projector is configured to project an image onto a screen. A motion detector is configured to detect motion of a user in proximity to the screen. The example method, system, and apparatus sense a user moving a finger (e.g., making a gesture) over the screen to draw a shape and accordingly determine/output the appropriate graphical object. In another example, motion sensors may be connected to a television. The example method, system, and apparatus receive information from the motion sensors regarding user movement over the television screen to draw a shape and accordingly determine/output to the television the appropriate graphical object. In yet another example, a hand tracker (e.g., the Leap Motion™ Controller) is configured to record how a user's hands move in free space. The example method, system, and apparatus use the information regarding a user's hand movement in free-space or air as a gesture to determine and output the appropriate graphical object.

The example method, system, and apparatus may be implemented as a graphical object manager. In an embodiment, a graphical object manager is provided within an application local to a client device (e.g., a computer, laptop, processor, server, smartphone, smartwatch, tablet computer, etc.). For instance, a graphical object management application may be installable on a client device. The application is configured to locally detect, predict, export, store, and/or otherwise manage the creating of graphical objects on a client device.

In another embodiment, the graphical object manager may be implemented within a centrally accessible service provided by a service provider. In this embodiment, a service provider may host the graphical object manager as a centralized service (e.g., a cloud-based service) configured to remotely detect, predict, export, store, and/or otherwise manage graphic objects drawn on a communicatively coupled client device. A client device may access the service via a web browser and/or an application programmable interface ("API") to create, modify, export, and/or import graphical objects.

The graphical object manager disclosed herein provides a framework for creating objects based on a user's hand-drawn gestures on a touchscreen. This includes determining which object a user is attempting to draw (e.g., detection of a rectangle) and predicting which object a user is beginning to draw (e.g., determine a user is starting to draw a circle). This also includes enabling users to modify, store, and export created objects.

The example graphical object manager enables users to relatively easily craft/edit figures (e.g., presentations, storyboards, flowcharts, documents, whiteboard, etc.) from handdrawn gestures on a touchscreen. The graphical object manager is configured to detect each object a user is attempting to draw and outputs a formalized version of the object. The graphical object manager also enables a user to modify, link, share, and/or combine formalized objects. The graphical object manager further enables a single object, multiple objects, or a figure of objects to be exported to another application (e.g., a presentation application) in a format native to that application for further customization and editing.

In an example embodiment, a graphical object manager prompts a user to draw an object on a touchscreen. The prompt may include providing a blank screen (or a portion of a blank screen) in which a user may make gestures. In other instances, the graphical object manager may be invoked in conjunction with one or more applications such that object detection/prediction/management is provided in addition to the application. For instance, the graphical object manager enables users to draw objects overtop a web browser showing a web page or draw objects within a word processing, presentation, drawing, flow-charting, diagramming, or spreadsheet program.

The graphical object manager uses a coordinate-plane to determine coordinates of one or more gestures provided by a user. In some instances, the graphical object manager sizes, positions, and/or orientates the coordinate-plane based on the dimensions of the received gestures. In particular, the graphical object manager may size and position a coordinate-plane to cover or include all portions of received gestures (e.g., a coordinate-plane with a length corresponding to a greatest length of the gestures and a width corresponding to a greatest width of the gestures.

As disclosed herein, an example coordinate-plane includes at least two moat regions that are positioned along a perimeter. The moat regions collectively form a moat space. Moat regions are designated areas of a coordinate-plane used to determine the significance of a user provided gesture. As described in more detail below, moat regions/moat spaces are dynamically formed based on the size of a user's gesture. This means that the length of each moat region is based on the start and end of a user gesture. Such a configuration enables the graphical object manager to detect an object regardless of the size of a user's gesture. This dynamic sizing of moat regions (and the coordinate-plane) enables, for example, the graphical object manager to generate a large oval graphical object corresponding to a similarly sized oval drawn by a user. In other embodiments, the moat regions may be less dynamic and/or static. For example, a coordinate-plane and corresponding moat regions may be fixed in size relative to a screen size of a client device. In these other embodiments, the graphical object manager may generate graphical objects of a specified default shape and enable a user to subsequently change the size/dimensions of the object.

A detected moat region is a moat region that includes enough portions of a user gesture to traverse the moat region or enough portions of a gesture that are above a specified threshold. The example graphical object manager is configured to determine which graphical object has been drawn by a user based on a number of detected moat regions. In instances where moat regions are located on a side or a perimeter of the coordinate-plane (or generally have a linear shape), the graphical object manager determines that a user gesture is a straight line if enough coordinates corresponding to the gesture are included within a moat region. The number of points may vary by design and/or specification of a user. For instance, the graphical object manager may be programmed to designate a moat region as being detected if, for example, 75% of the coordinates associated with the gesture are included within the moat region.

As discussed below, the example coordinate-plane has a rectangular shape based, for example, on dimensions of a client device display. The coordinate-plane includes four moat regions, one moat region for each side. The four moat regions form a moat space. The example graphical object manager determines the size, positioning, and/or orientation of the coordinate-plane and corresponding moat regions based on gestures received from users.

In an example, a coordinate-plane is configured to have a rectangular shape and include four moat regions positioned along each side to form a moat space. The example graphical object manager detects a user's gestures through the moat space and determines whether each moat region was traversed from one end to an opposite end. Alternatively, the graphical object manager determines how many of the coordinates of the gestures are included within each of the moat regions. If a moat region was traversed and/or a threshold number of coordinates are within a moat region (e.g., 50% of a length of a moat region), the graphical object manager designates the moat region as a detected moat region. In other words, the graphical object manager determines there is enough of a user gesture in a moat region to designate that moat region as a side or portion of an object.

The example graphical object manager uses the number of detected moat regions to determine a graphical object that a user is attempting to draw. For example, four detected moat regions correspond to a square or rectangle while one or two detected moat regions corresponds to a triangle. The example graphical object manager may use other rules to further determine which object is being drawn. These rules may include ratio's of dimensions of gestures relative to each other (e.g., a length of a height gesture compared to a length of a width gesture). The rules may also be based on an amount and/or location of coordinates within a moat region that are not a designated moat region. The rules may further be based on amounts/locations of angles formed by intersecting gestures (or a continuous gesture that changes direction). It should be appreciated that the number of rules and types of rules is virtually limitless.

After determining which graphical object a user is attempting to draw, the example graphical object manager is configured to cause a formalized version of the object to be displayed. The formalized version is an editable default-shaped object based on a definition of the object. For example, responsive to detecting a user is attempting to draw a rectangle, the graphical object manager causes a rectangle object to be displayed. A user may then change the size, shape, positioning, color, fill, line width, etc. of the rectangle. The graphical object manager is also configured to store a figure or data structure of multiple objects generated from a user's gestures.

It should be appreciated that in other embodiments, a different configuration of moats and/or coordinate-planes may be used. For instance, the coordinate-plane may have a circular shape and be partitioned into three moat regions along the circumference. Alternatively, the moat region may have a hexagonal shape with one or two moat regions along each side. Moreover, the shape of the coordinate-plane may not necessarily correspond to the moat regions. For instance, the graphical object manager may include a rectangular coordinate-plane and circular moat regions.

Graphical Object Environment

FIG. 1 shows a diagram of a graphical object environment 100, according to an example embodiment of the present disclosure. The environment 100 includes client devices 102, a service provider server 104, and third-party servers 106 communicatively coupled via a network 108 (e.g., the Internet). The client devices 102 may be any type of device including, for example, a laptop, a computer, a processor, a server, a smartphone, a smartwatch, a tablet computer, smart-eyewear, etc. The client devices 102, such as the tablet computer 102a and the smartphone 102b, may include a touchscreen input component. Alternatively, the client devices 202, such as client devices 102c and 102d, may include a display that receives inputs via a separate device, such as a mouse or motion pad.

The example service provider server 104 includes an entity that hosts, manages, or otherwise provides a graphical object manager 110. For instance, the service provider server 104 may transmit the graphical object manager 110 as an application or plug-in to requesting client devices 102 responsive to receiving a request. In this instance, the client devices 102 may install the graphical object manager 110 as a stand-alone (or plug-in) application. The installed graphical object manager 110 may then be used in conjunction with other applications and/or features on the client device 102. The service provider server 104 may transmit periodic updates (and/or object definition data structures) to the remotely located applications 110.

In other instances, the service provider server 104 may host the graphical object manager 110. The service provider server 104 may host the graphical object manager 110 within a cloud-based environment. A web browser and/or an API on the client devices 102 may access the hosted service at the server 104. For instance, a user may access the graphical object manager 110 hosted by the server 104, via the client device 102a, to draw objects. The server 104 may enable a user to create one or more objects in a figure, store the objects and/or the figure to a database 112, and/or export the objects and/or figure to one of the third-party servers 106 and/or the client device 102.

The example service provider server 104 is communicatively coupled to the database 112 via any wired or wireless connection. In addition to storing graphical objects, the example database 112 is configured to store a copy of the graphical object manager 110 and/or data structures of object definitions. As discussed in more detail below, object definitions specify how the graphical object manager 110 is to detect and/or predict an object based on a user's gestures. A data structure may store an object definition for each possible supported graphical object. The database 112 may store a data structure separate for each user, thereby enabling the graphical object manager 110 to adapt specifically to each user and accordingly predict objects based on previous gestures of that user.

Alternatively, the database 112 may store a global definition of objects, which is transmitted to each client device 102. For instance, the service provider server 104 may create global object definitions by analyzing gestures and feedback provided by a plurality of users. The database 112 may be implemented by any computer-readable medium, including RAM, ROM, flash memory, magnetic or optical disks, optical memory, or other storage media.

The example third-party servers 106 host applications and/or provide applications that may use created objects and/or figures of objects. For example, the third-party server 106a may include a first cloud-based document processing application in a first format and the third-party server 106b may include a second cloud-based document processing application in a second format. The graphical object manager 110 is configured to export individual objects and/or figures of objects to any of the third-party servers 106 such that the objects and/or figures of objects are accessible in a native format specific for the application. This configuration enables a user to create objects and/or figures of objects using the graphical object manager 110, and then easily export these objects and/or figures of objects to another application such that they may be edited in a format of the receiving application.

The third-party servers 106 may also include social media servers 106c configured to display or otherwise provide objects and/or figures of objects in a social media context. For example, the graphical object manager 110 may transmit a graphical object to the server 106c causing the object to be displayed on a profile page of an associated user. The server 106c may also facilitate the sharing of objects and/or figures of objects provided by users and/or the service provider server 104. Additionally or alternatively, the server 106c and/or the service provider server 104 may make available user-created object definitions to other users.

Graphical Object Manager

Figure 2:
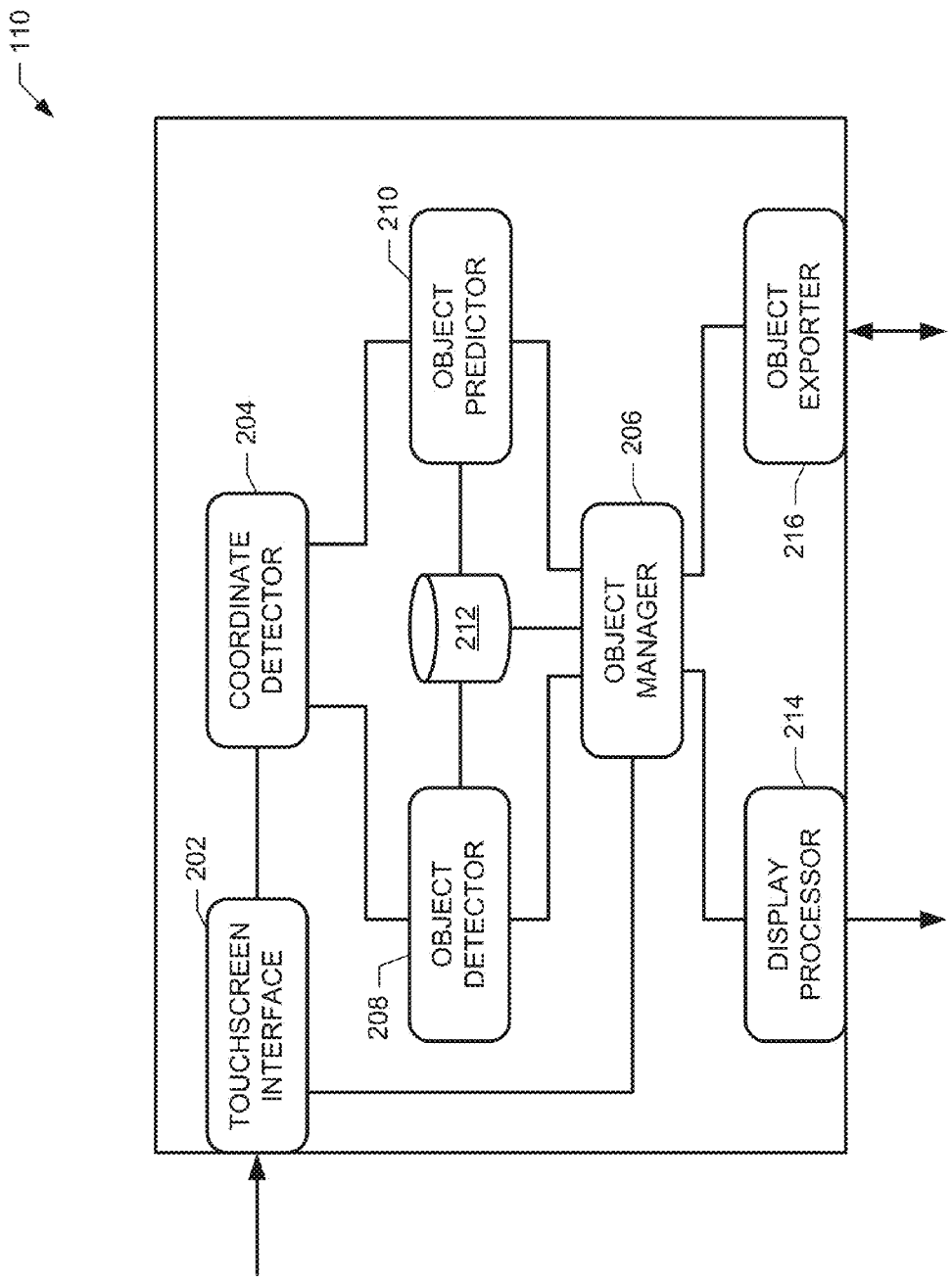
FIG. 2 shows a diagram of the graphical object manager of FIG. 1, according to an example embodiment of the present disclosure.

FIG. 2 shows a diagram of the graphical object manager 110 of FIG. 1, according to an example embodiment of the present disclosure. It should be appreciated that the blocks within the diagram may be rearranged, combined, and/or broken into other blocks. Further, it should be appreciated that the blocks may only be representative definitions of procedures, steps, routines, and/or algorithms performed by the graphical object manager 110 to detect, predict, modify, and/or export graphical objects based on user gestures. For instance, one or more of the blocks may be implemented in software, a machine readable medium executed by a processor within, for example, the client device 102 and/or the server 104. Alternatively, one or more of the blocks may be implemented in hardware as an application specific integrated circuit ("ASIC") or microprocessor. In an example embodiment, each block is provided as a distinct hardware module and/or software module.

The example graphical object manager 110 is configured to detect a user's attempt to draw objects on the client device 102 though electronic gestures and present a proper/formalized (or otherwise defined) version of the object. The example graphical object manager 110 may also predict an object (or provide a user a list of possible objects) based on a user's partial attempt. The graphical object manager 110 includes a feedback component to refine or improve object prediction. The example graphical object manager 110 is also configured to store objects, create/store a figure with more than one object, edit figures/objects, and/or facilitate the export of objects/figures to other applications/services in a format native to the receiving application.

i) Touchscreen Interface

To process gestures received on a touchscreen of the client device 102, the example graphical object manager 110 of FIG. 2 includes a touchscreen interface 202. The example touchscreen interface 202 interface is configured to receive data from touchscreen sensors and process this data into locations on a touchscreen to which one or more gestures were applied. The touchscreen interface 202 may also receive user inputs corresponding to object modification, orientation change, position change, etc. The touchscreen interface 202 analyzes the received inputs to determine a transmission destination. Data or inputs corresponding to gestures are routed by the touchscreen interface 202 to a coordinate detector 204. Data or user inputs corresponding to object modification are routed by the touchscreen interface 202 to the object manager 206. The touchscreen interface 202 may identify, for example, data associated with gestures based on data that includes coordinates of one or more hand-drawn lines. In comparison, the touchscreen interface 202 may identify, for example, modification data based on gestures that include taps, drags, and short line inputs corresponding to a position relative to an already displayed object.

The example touchscreen interface 202 may also receive indications that a user has used a zoom feature on the touchscreen of the client device 102. For example, a user may enlarge or zoom-into a figure or window of an application to draw smaller shapes, features, or details. The touchscreen interface 202 is configured to correlate the data from the touchscreen sensors to a user-specified zoom level to enable the coordinate detector 204, the object detector 208, and/or the object predictor 210 to properly size the determined graphical object.

ii) Coordinate Detector

Figure 3:
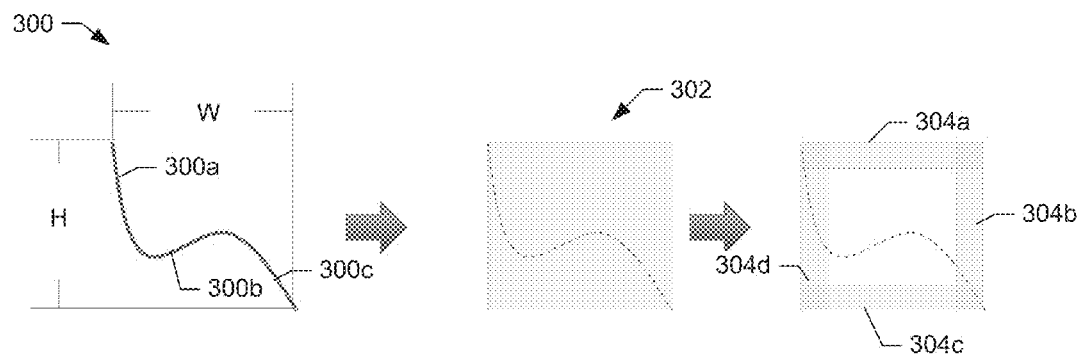
FIGS. 3 to 5 show illustrations of processing performed by the graphical object manager of FIGS. 1 and 2, according to an example embodiment of the present disclosure.

The example coordinate detector 204 is configured to process touchscreen inputs of gestures into a coordinate-plane and associated moats. FIG. 3 shows an example diagram of the processing performed by the coordinate detector 204. Initially, the coordinate detector 204 receives one or more gestures 300 provided by a user on a touchscreen of a client device 102. At this point, the coordinate detector 204 may not determine a number of gestures but rather, analyze the gestures in their entirety.

As discussed before, the gestures include coordinates relative to dimensions of the touchscreen. The example coordinate detector 204 determines a coordinate plane 302 for the gestures 300. The coordinate-plane 302 is a localized grid of X and Y values relative to the gestures 300. The example coordinate detector 204 determines a size, position, and/or orientation of the coordinate-plane 302 based on dimensions of the gestures 300. The coordinate detector 204 determines a greatest width (W) of the gestures 300 and a greatest height (H) of the gestures 300. The coordinate detector 204 then sets a width of the coordinate-plane 302 to substantially match the greatest width (W) and a height of the coordinate-plane 302 to substantially match the greatest height (H). In other words, the coordinate detector 204 sets the dimensions of the coordinate-plane 302 to substantially cover all portions of the gestures 300.

Figure 4:
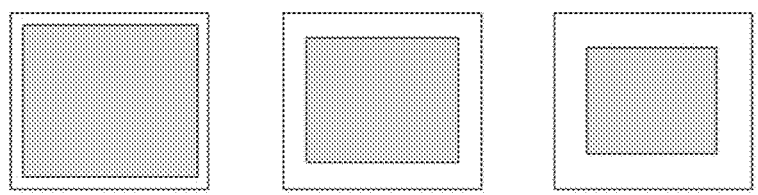

The example coordinate detector 204 next applies moat regions 304a, 304b, 304c, and 304d to the coordinate-plane 302 (it should be appreciated that the moat region 304d overlaps with the moat regions 304a and 304c). A moat region 304 is positioned along each side of a perimeter of the coordinate-plane 302 with corners of adjacent moat regions 304 overlapping to form collectively a moat space. The width of the moat-regions 304 may be set to a default value by a designer, be based on the size of the coordinate-plane 302, and/or specified by a user. FIG. 4 shows examples of different widths applied to moat regions. The width of the moat regions 304 corresponds to a sensitivity for detecting objects where relatively narrow moat regions correspond to a higher degree of sensitivity, thereby providing a user with less margin of error for creating an object.

As shown in FIG. 3, the moat regions 304 and coordinate-plane 302 have rectangular shapes. However, in other embodiments, the moat regions 304 and/or coordinate-plane 302 may have different shapes and/or be configured within a three-dimensional space. For instance, the coordinate-plane and moat regions could be circular, polygonal, three-dimensional, etc. Moreover, the shape of the coordinate-plane may differ from the moat regions as long as the coordinate-plane encompasses all of the moat regions (e.g., the moat regions could be triangular and the coordinate-plane may be circular). In yet other embodiments, the moat regions 304 may not overlap and/or a fewer/greater number of moat regions could be used. For instance, the four moat regions 304 could instead be eight moat regions positioned along a perimeter of the coordinate-plane.

Figure 5:
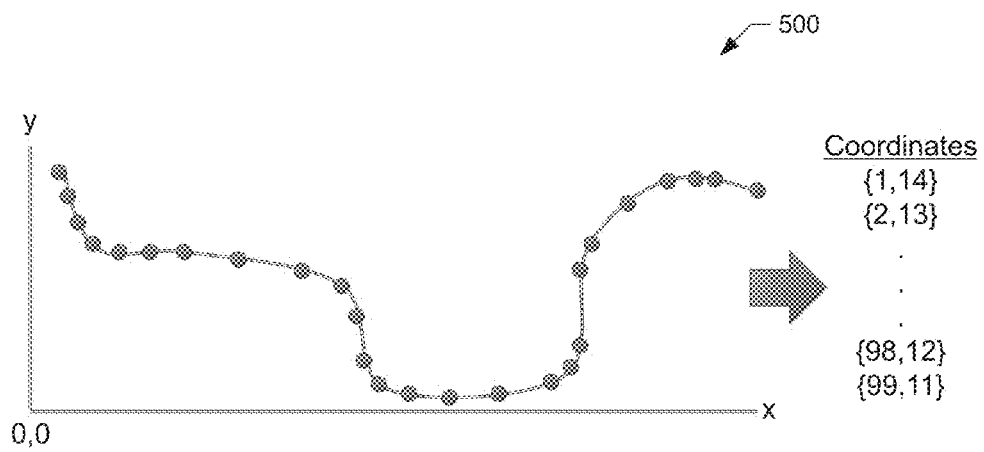

After determining the coordinate-plane 302 and the moat regions 304, the example coordinate detector 204 is configured to determine a size of the gestures 300 by determining coordinates of the gestures 300 relative to the coordinate-plane 302. FIG. 5 shows an example diagram of the coordinate mapping performed on gestures (e.g., the gestures 300 of FIG. 3 or gestures 500 of FIG. 5) by the coordinate detector 204. It should be appreciated that the gestures in FIG. 5 are not necessarily the same gestures 300 in FIG. 3.

As shown in FIG. 5, the example coordinate detector 204 identifies points along a gesture 500 and determines a coordinate for each point. The coordinate detector 204 may identify points based on slope changes of the gestures where more points are determined at locations where the slope of the gestures changes significantly. In this configuration, distances between points are estimated to be relatively straight lines, thereby enabling lengths of gestures to be determined. In other examples, the coordinate detector 204 may identify points based on other criteria. In yet other examples, the coordinate detector 204 may identify first and last coordinates to determine a direction of the gesture. The first and last coordinates may be determined by the touchscreen interface 202 and/or the coordinate detector 204 based on a time in which the coordinates are received.

The example coordinate detector 204 transmits the coordinates of the coordinate-plane 302, moat regions 304, and gestures 300 to an object detector 208 and/or an object predictor 210. As discussed in more detail below, the object detector 208 is configured to detect or determine an object based on gestures provided by a user. The object predictor 210 is configured to estimate or predict which object a user is attempting to draw based on at least a portion of a received gesture. To accommodate object prediction, the coordinate detector 204 may operate in a dynamic manner such that the coordinate-plane 302 and/or moats 304 are determined in almost real-time as a user is providing a gesture. In these instances, the coordinate detector 204 is configured to provide the coordinate-plane 302 and/or moats 304 to the object predictor 210 so that a graphical object may be predicted prior to a user providing complete gestures of an object.

iii) Object Detector

Figure 6:
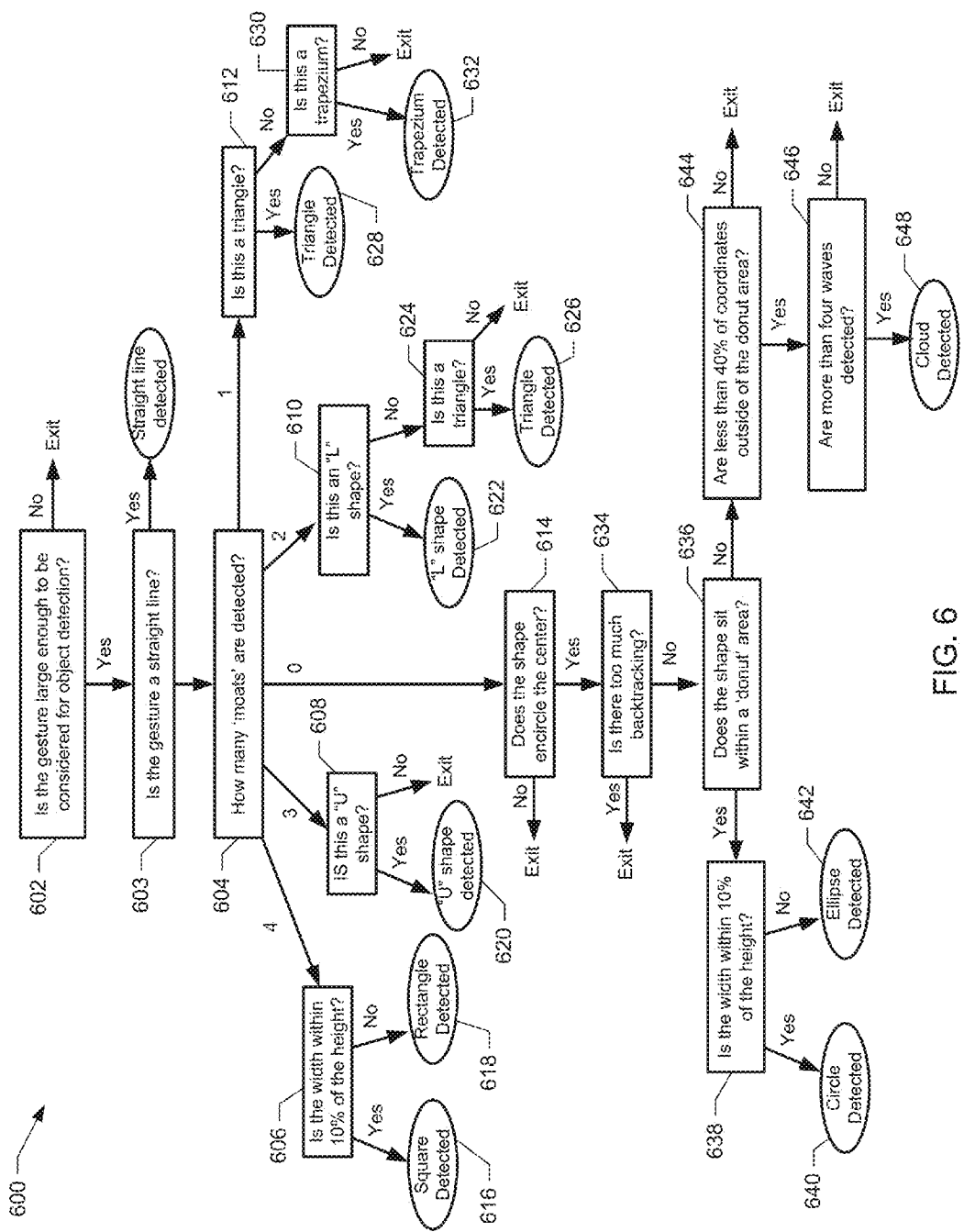
FIG. 6 shows a flow diagram illustrating example procedures performed by the graphical object manager of FIGS. 1 and 2 to detect an object based on gestures provided by a user, according to an example embodiment of the present disclosure.

The functionality of the object detector 208 is described in conjunction with the flow diagram of FIG. 6, which includes an example procedure 600 to determine an object based on user-drawn gestures, according to an example embodiment of the present disclosure. Although the procedure 600 is described with reference to the flow diagram illustrated in FIG. 6, it will be appreciated that many other methods of performing the acts associated with the procedure 600 may be used. For example, the order of many of the blocks may be changed, certain blocks may be combined with other blocks, and many of the blocks described are optional.

The example procedure 600 begins when the object detector 208 receives coordinates of the gestures 300, coordinate-plane 302, and moat regions 304. The object detector 208 then determines which of the moat regions 304 may be designated or set as detected moat regions (blocks 602 to 604). This includes determining if the gestures 300 are large enough for object detection and comparing the coordinates of the gestures 300 to the coordinates defining the moat regions 304 (block 602). If during the procedure 600 the object detector 208 is unable to determine an object based on the gestures, the object detector 208 sends a message to the graphical object manager 206 indicating that a graphical object has not been detected, after which the graphical object manager 206 may interpret the gesture as a free-form sketch of a curved line comprised of the gesture's coordinates, or alternatively display an error message to the user.

Figure 38:
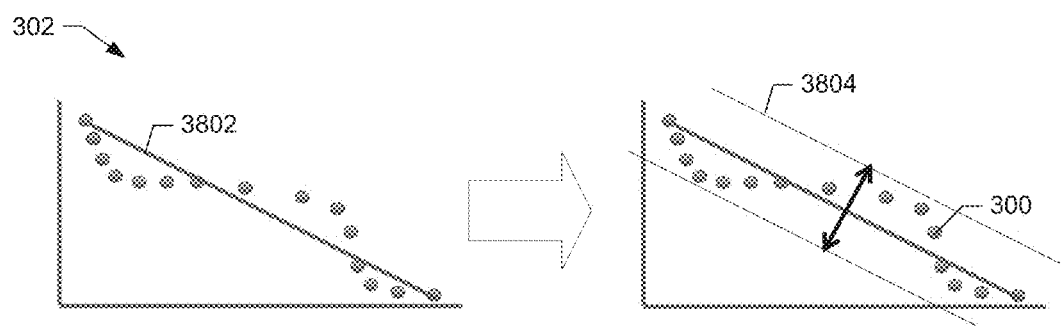
FIGS. 38 and 39 show diagrams illustrative of tests performed by the graphical object manager of FIGS. 1 and 2 to determine a gesture corresponds to a straight line graphical object, according to an example embodiment of the present disclosure.
Figure 39:
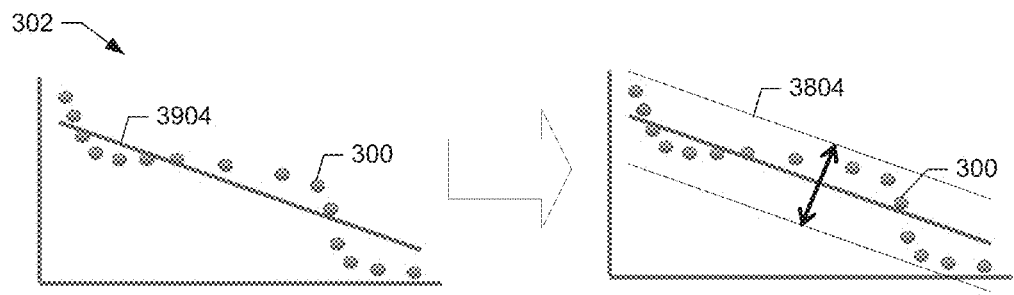

After determining that the gestures 300 are large enough for detection, the example object detector 208 is configured to determine if the gestures correspond to a straight or curved line (block 603). FIGS. 38 and 39 show diagrams illustrative of tests performed by the object detector 208 to determine the gestures 300 within the coordinate-plane 302 correspond to a straight line graphical object, according to an example embodiment of the present disclosure. The example object detector 208 may perform one or both of the illustrated tests.

In one embodiment, the object detector 208 is configured to derive a straight line 3802 from a starting coordinate to an ending coordinate of the gestures 300. The object detector 208 then applies a threshold 3804 to the straight line 3802. The object detector 208 determines if a specified number of coordinate points (e.g., all of the coordinate points, 75% of the coordinate points, etc.) are within the threshold 3804. The specified number may be relative to a length of the gestures 300 such that relatively shorter gestures have a lower specified number. Responsive to determining that the specified number of coordinate points is within the threshold 3804, the object detector 208 determines that the gestures 300 correspond to a straight line object. The object detector 208 accordingly transmits the straight line identifier (and corresponding gesture coordinates) to the object manager 206.

It should be appreciated that the threshold 3804 may be configurable based on a desired sensitivity of a user. For example, the object detector 208 may only consider coordinate points close to the straight line 3802 for a relatively low threshold. Alternatively, the object detector 208 may be configured for low sensitivity and consider coordinate points relatively far from the straight line 3802.

In another embodiment, the object detector 208 is configured to derive a straight line 3904 by applying one or more linear regression algorithms to the gestures 300. The object detector 208 then applies the threshold 3804 to the straight line 3904. The object detector 208 determines if a specified number of coordinate points (e.g., all of the coordinate points) are within the threshold 3804. Responsive to determining that the specified number of coordinate points is within the threshold 3804, the object detector 208 determines that the gestures 300 correspond to a straight line object.

If the gestures 300 do not correspond to a straight line graphical object in block 603, the example object detector 208 determines if there are one or more detected moat regions (block 604). The object detector 208 designates a moat region as being detected if a threshold number of coordinates of the gestures 300 are included within the moat region. The threshold may be set by a user, designer, and/or be based on a size of the moat region. For example, a threshold could include 33%, 50%, 75%, etc. of a length of a moat region. To make the comparison, the object detector 208 determines which gesture coordinates are included within a moat region 304, determines a distance between the coordinates, and compares the distance to a threshold 3804.

Figures 7, 8:
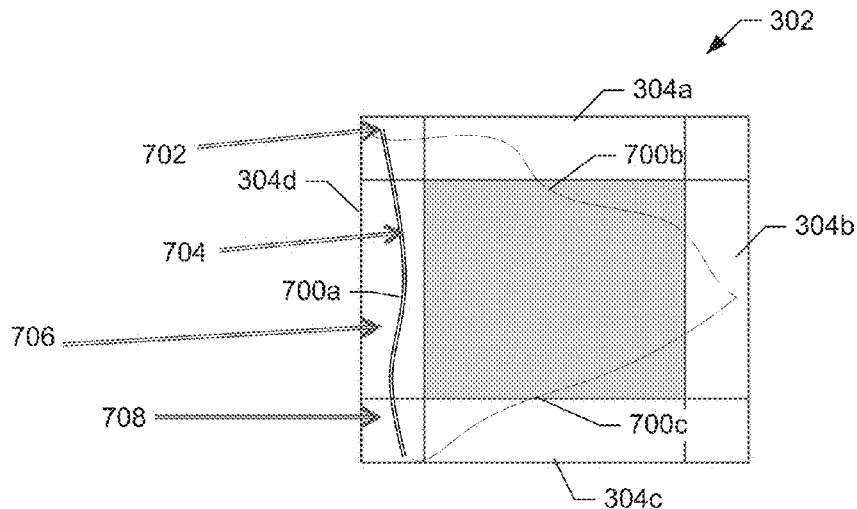
FIG. 7 shows an example figure of a moat region detection performed by the graphical object manager of FIGS. 1 and 2, according to an example embodiment of the present disclosure.
FIG. 8 shows an example diagram of a data structure that includes rules for detecting objects, according to an example embodiment of the present disclosure.

FIG. 7 shows an example diagram of the moat region detection performed by the object detector 208. In this example, gesture 700a includes a single hand-drawn line, gesture 700b includes another hand-drawn line, and gesture 700c includes yet another hand-drawn line. It should be appreciated that the coordinate-plane 302 in FIG. 7 is dimensioned based on this gestures 700a-c and that not necessarily all moat regions will include a portion of the gestures 700a-c.

To identify a moat region as a detected moat region, the example object detector 208 determines a first coordinate 702 that is included within the intersection/overlap of moat regions 304a and 304d. The object detector 208 then traverses along the coordinates of the gesture 700a through the moat region 304d (as indicated by points 704 and 706). The object detector 208 then determines an end coordinate 708 within the intersection of moat regions 304c and 304d. The example object detector 208 may also check to ensure none (or specified number) of the intermediate coordinates between coordinates 702 and 708 are outside of the moat region 304d. For the coordinates within the moat region 304d, the object detector 208 determines an approximate distance between the coordinates and compares this distance to a length of the moat region 304d. In this example, the object detector 208 determines that the length of the gesture 700a exceeds a predetermined threshold and designates the moat region 304d as a designed moat region. In other words, the object detector 208 determines that gesture 700a traversed the moat region 304d. Additionally or alternatively, the object detector 208 may compare the number of gesture coordinates within the moat region 304d to a length of the moat region 304d to determine if the gesture coordinates are within a predetermined length, area, and/or volume of the moat region 304d.

Regarding gestures 700b and 700c, the example object detector 208 determines that the respective moat regions 304a, 304b, and 304c have not been traversed and/or that a predetermined number of threshold coordinates (e.g., a distance within the moat regions) have not been reached by the coordinates corresponding to gestures 700b and 700c. The object detector 208 accordingly determines that the other moat regions 304a, 304b, and 304c are not detected moat regions despite at least a portion of gestures 700b and 700c being included within those regions.

It should be appreciated that in some instances the hand-drawn gesture 700a may include points that are outside of the moat region 304d. The object detector 208 is configured to discount or ignore the coordinates corresponding to the potions of the gesture 700a that are outside of the moat region 304. The object detector 208 accordingly does not include the estimated distance to the exterior coordinates as being within the moat region 304 for comparison to a specified threshold for designating whether the moat region 304d is a detected moat region.

The example object detector 208 may also apply one or more rules to determine whether to designate a moat region as a detected moat region. For instance, the object detector 208 may disregard coordinates after a gesture has changed direction significantly (e.g., greater than a 30 degree change), backtracked, etc. The object detector 208 may also disregard coordinates that are separated by a predetermined gap within the gesture 700a. The object detector 208 may further apply a discounted weight to distances between coordinates that are outside of a moat region 304.

The example object detector 208 uses the above described techniques to determine how many of the four moat regions 304 are detected moat regions (block 604). As described, the object detector 208 makes a comparison for all of the coordinates of a gesture that are included within each of the moat regions 304. Thus, different portions of a gesture may not necessarily be considered individually. For example, FIG. 3 shows that the gestures 300 include a first gesture 300a of a line sweeping downward, a second gesture 300b of an upward line, and a third gesture 300c of another line sweeping downward. The object detector 208 compares the coordinates of the gestures 300 individually to each moat region 304 to determine a number of detected moat regions. Thus, in the example of FIG. 3, only one moat region 304d is a detected moat region.

In other alternative examples, the object detector 208 may partition the gestures 300 into the individual gestures 300a, 300b, 300c based on rules (e.g., change in slope, angle, etc.) and fit or apply a moat region to each gesture. In these alternative examples, the moat regions may be positioned/sized/orientated throughout the coordinate-plane based on the location of the gestures. This dynamic configuration of moat regions enables the object detector 208 to detect objects with relatively complex geometries because the moat regions are based on the gestures and not necessarily the positioning of fixed moat regions at a perimeter of a coordinate-plane.

Returning to FIG. 6, the example object detector 208 next determines an object type based on a number of detected moat regions. For example, the object detector 208 performs the procedure discussed in conjunction with block 606 if there are four detected moat regions, block 608 if there are three detected moat regions, block 610 if there are two detected moat regions, block 612 if there is one detected moat region, and block 614 if there are no detected moat regions. It should be noted that each block corresponds to a type of object (e.g., rectangular, U-shaped, L-shaped, triangular, circular). In other examples, the object detector 208 may progress to another block if there are greater or fewer moat regions (and corresponding detected moat regions) of the coordinate-plane 302. For instance, the object detector 208 may progress to a block for polygon-shaped object types.

To determine which graphical object corresponds to a user-provided gesture, the example object detector 208 accesses one or more rule data structures included within database 212. FIG. 8 shows a diagram of an example data structure 800 that includes rules for detecting graphical objects. The data structure 800 includes a name (or identifier) of a graphical object, a number of detected moat regions corresponding to the graphical object, a size ratio rule, and other rules based on the object type. The data structure 800 can include additional or fewer rules based on the types of graphical objects to be detected. The data structure 800 may be stored to the database 212 and/or the client device 102 when the graphical object manager 110 is provided to the client device 102. Additionally or alternatively, the data structure 800 may be updated periodically by other users and/or the service provider server 104 to include improved object detection rules, object detection rules for additional objects, etc.

In the illustrated example, the object detector 208 accesses the data structure 800 to determine graphical objects based on a number of detected moat regions. The object detector 208 then uses the one or more rules to select a graphical object from among the determined objects. It should be appreciated that the identifier or object name corresponds to (or references) a definition as to how the graphical object is to be rendered and displayed on a client device 102. The definition includes editing properties (e.g., line width, color, fill, size, etc.) that the object detector 208 and/or object manager 206 may set based on the provided gestures. For example, the object detector 208 and/or object manager 206 uses properties within the definition to size a graphical object to substantially match the size of gestures provided by a user. The object detector 208 and/or object manager 206 may also use properties within the definition to position/orientate the graphical object to match/align the location/orientation of gestures provided by a user on the touchscreen.

a) Rectangle Type Objects

Returning to FIG. 6, the example object detector 208 in block 606 determines whether the graphical object is a square or rectangle by accessing the size ratio rules in the data structure 800 to determine whether a length (or width) is within 10% of the height (e.g., a size ratio of 90%). If this is the case, the object detector 208 determines that the user is attempting to draw a square and accordingly transmits the square identifier (and corresponding gesture coordinates) to the object manager 206 (block 616). However, if the width is not within 10% of the height, the object detector 208 determines that the user is attempting to draw a rectangle and accordingly transmits the rectangle identifier (and corresponding gesture coordinates) to the object manager 206 (block 618).

b) U-Shape and L-Shape Type Objects

In block 608, the example object detector 208 determines whether a user is attempting to draw a U-shaped object. As discussed, three detected moat regions indicate to the object detector 208 that a U-shape object is being drawn. The object detector 208 may also check to make sure that a fourth moat region does not include coordinates, corresponding to an open side of the U-shape. If the rules are satisfied for a U-shape, the object detector 208 determines that the user is attempting to draw a U-shape graphical object and accordingly transmits the U-shape identifier (and corresponding gesture coordinates) to the object manager 206 (block 620).

In block 610, the example object detector 208 determines whether a user is attempting to draw an L-shaped graphical object. As discussed, two adjacent detection moat regions indicate to the object detector 208 that an L-shape object is being drawn. The object detector 208 may also determine whether third and fourth moat region do not include coordinates, corresponding to open sides of the L-shape. The object detector 208 further checks to make sure there are no gesture coordinates within a center portion of the coordinate-plane 302. If these rules are satisfied for an L-shape, the object detector 208 determines that the user is attempting to draw an L-shape object and accordingly transmits the L-shape identifier (and corresponding gesture coordinates) to the object manager 206 (block 622).

c) Triangle Type Objects

Figure 9:
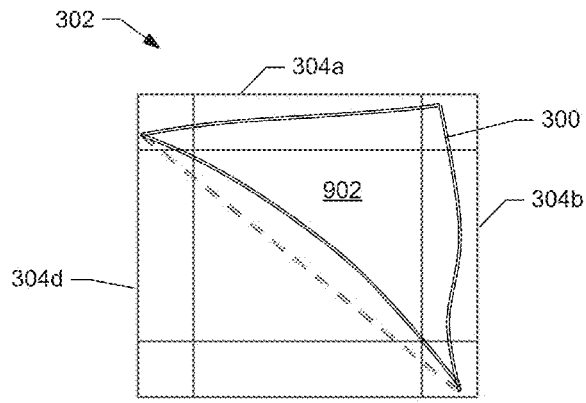
FIGS. 9 to 17 show diagrams of graphical object detection performed by the example graphical object manager of FIGS. 1 and 2, according to an example embodiment of the present disclosure.

The example object detector 208 detects a triangle graphical object if either one or two detected moat regions are present. In block 624, for instance, after detecting the gestures 300 are not an L-shape, the object detector 208 determines whether two detected adjacent moat regions correspond to a triangle. To make this determination, the object detector 208 determines whether the gestures 300 include coordinates that connect two extremities of the gesture within the detected moat region to an apex. For example, FIG. 9 shows an example diagram of a determination made by the object detector 208 to identify a triangle with two detected adjacent moat regions 304a and 304b based on rules within the data structure 800. As shown, the object detector 208 is able to determine that there are coordinates of a gesture that traverse a center portion 902 of the coordinate-plane 302 and meet at an apex in another moat region 304d.

Additionally, because the line through the center of the coordinate-plane 302 is not within a moat, the object detector 208 is configured to determine whether a variation in the gesture is within a reasonable parameter (e.g., 10 pixels as denoted by the dashed line in FIG. 9). If the gesture coordinates are within a specified parameter or threshold, the object detector 208 determines that the rules for a triangle are satisfied and accordingly transmits a triangle identifier (and corresponding gesture coordinates) to the object manager 206 (block 626).

Figure 10:
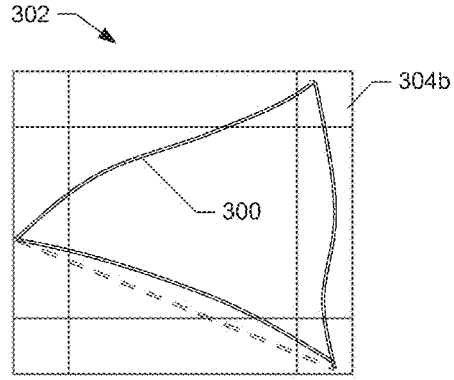

FIG. 10 shows an example diagram of a determination made by the object detector 208 to identify a triangle with one detected moat region 304b based on rules within the data structure 800. In block 612, the object detector 208 determines whether a triangle with one detected moat region is being drawn. To make the determination, the object detector 208 determines a location of an apex of the gestures 300. The apex may be defined within the data structure 800 to be a furthest point from the single detected moat region. The object detector 208 also determines whether the received gestures include coordinates that connect the first and last ends of the gesture within the detected moat region to the apex. The object detector 208 further determines whether the coordinates that connect the first and last ends to the apex are within a specified threshold. If these rules are satisfied, the object detector 208 transmits a triangle identifier (and corresponding gesture coordinates) to the object manager 206 (block 628).

d) Trapezium Type Objects

Figure 11:
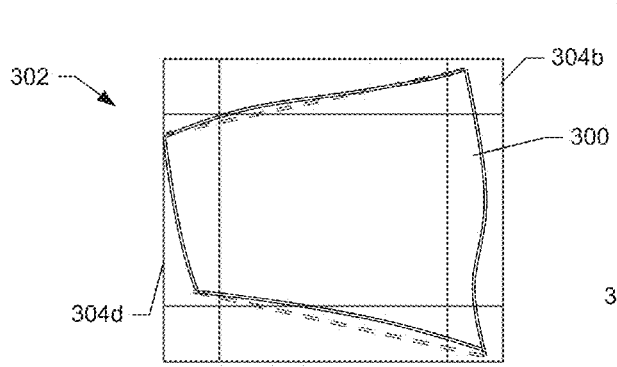

In block 612, if the object detector 208 determines that the gestures 300 do not correspond to a triangle, the object detector 208 then determines if the gestures correspond to a British trapezium (block 630). FIG. 11 shows an example diagram of a determination performed by the object detector 208 to identify a British trapezium. It should be noted that only one moat region 304b was detected because the coordinates in the other moat regions do not meet the specified thresholds. To identify a British trapezium, the object detector 208 calculates a cumulative distance traversed by the gesture coordinates in a moat region 304d opposite of the detected moat region 304b.

The object detector 208 determines parallel sides of the British trapezium if the cumulative distance is greater than a threshold (e.g., 25%, 50%, etc.) of the moat length. The object detector 208 also determines whether gesture coordinates connect the first and last coordinates of the gesture coordinates within the detected moat region 304b with the gesture coordinates parallel to the detected moat region. The object detector 208 further determines whether the coordinates that connect the first and last ends to the gesture coordinates parallel to the detected moat region 304b are within a specified threshold. If these rules are satisfied, the object detector 208 transmits a trapezium identifier (and corresponding gesture coordinates) to the object manager 206 (block 632).

e) Circular Type Objects

Figure 12:
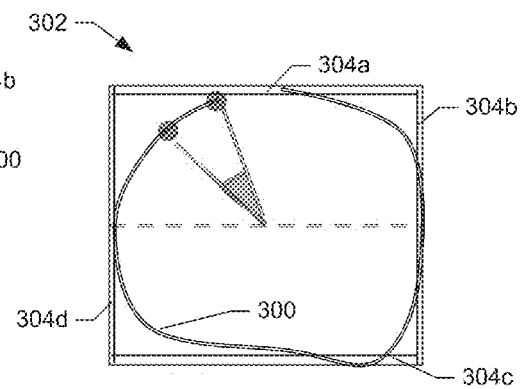
Figure 13A:
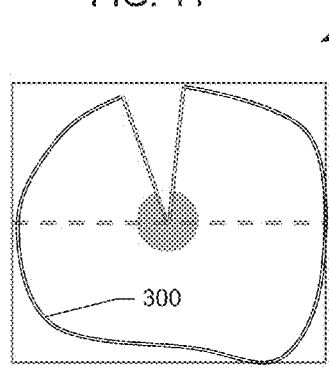

FIGS. 12 and 13A show diagrams illustrative of determinations performed by the object detector 208 to identify a circular graphical object. For zero detected moat regions, the example object detector 208 determines if the gesture coordinates encircle a center of the coordinate-plane 302 (block 614). To make this determination, the object detector 208 compares the angle traversed by two coordinates relative to the center of the coordinate-plane 302, as shown in FIG. 12. The object detector 208 then determines the cumulative angle traversed by the coordinates, as shown in FIG. 13A. The object detector 208 determines that the gestures correspond to a circular graphical object if the cumulative angle is greater than a threshold (e.g., 90% of 360 degrees).

The object detector 208 also determines whether any gesture coordinates correspond to backtracking by detecting coordinates that progress in an opposite direction than the cumulative angle (block 634). If the amount of backtracking is greater than a threshold (e.g., 10% of the cumulative angle), then the object detector 208 determines that a circular graphical object is not being drawn. If the backtracking is less than the threshold, the object detector 208 determines that the user attempted to draw a circular graphical object.

Figure 13B:
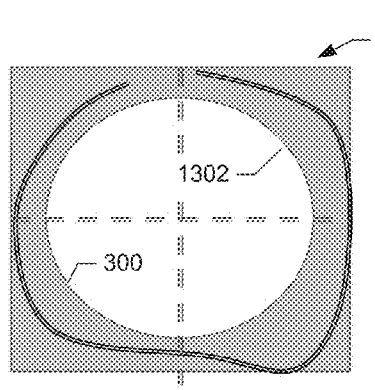

As shown in FIG. 13B, the object detector 208 determines the type of the circular object by calculating an area created by an analysis ellipse 1302 that includes a first predetermined threshold (e.g., 65%) of a width of the coordinate-plane 302 and a second predetermined threshold (e.g., 65%) of a height of the coordinate-plane 302 (block 636). The object detector 208 then determines which of the gesture coordinates are inside or outside of the analysis ellipse 1302. The area outside of the analysis ellipse 1302 but within the coordinate-plane 302 is considered a donut. The object detector 208 determines that the circular object is at least a circle or ellipse if a third predetermined number of coordinates (e.g., 95%) are within the donut (e.g., outside of the analysis ellipse 1302 but within the coordinate-plane 302) (block 638). The object detector 208 determines that the graphical object is a circle if the width is within 10% of a height and transmits a circle identifier (and corresponding gesture coordinates) to the object manager 206 (block 640). The object detector 208 determines that the graphical object is an ellipse if the width is greater than 10% of the height and transmits an ellipse identifier (and corresponding gesture coordinates) to the object manager 206 (block 642).

Figure 14:
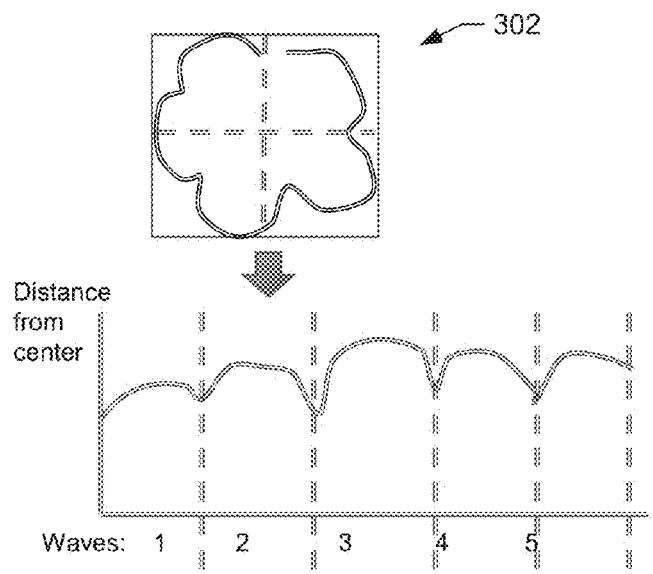

Returning to block 636, the object detector 208 checks to determine if the object is a cloud if the object is determined to not correspond to an ellipse. FIG. 14 shows a diagram illustrative of determinations performed by the object detector 208 to identify a cloud. To make the determination, the object detector 208 determines whether less than a threshold number of gesture coordinates are outside of the analysis ellipse (block 644). If this is the case, the object detector 208 then determines a distance of each of the gesture coordinates from an origin, as shown in FIG. 14. The object detector 208 then locates local minimum points among the coordinates to divide the coordinates into waves between the local minimum points. The object detector 208 determines that the graphical object is a cloud if there are at least a predetermined number of waves (e.g., four) (block 646). The object detector 208 then transmits a cloud identifier (and corresponding gesture coordinates) to the object manager 206 (block 648).

Returning briefly to block 614, the object detector 208 may also be configured to detect a user is attempting to select or edit a graphical object rather than draw a new graphical object. As discussed above, a user may select a graphical object by tapping on (or inside) an existing graphical object. A user may also select a graphical object by drawing a circle (e.g., lassoing) the desired graphical object(s). As can be appreciated, a lasso gesture resembles a gesture to create a circular graphical object. To distinguish a lasso gesture from a circular gesture, the example object detector 208 is configured to determine whether there are any existing graphical objects within an enclosed shape of a graphical object created by the gesture and/or any existing graphical objects traversed or intersected by the gesture. The object detector 208 is configured to determine the user is making a lasso gesture if a graphical object is intersected by the gesture or within the gesture. The object detector 208 accordingly transmits an instruction to the object manager 206 indicative of the selected graphical object(s).

f) Connector Objects

Figure 15:
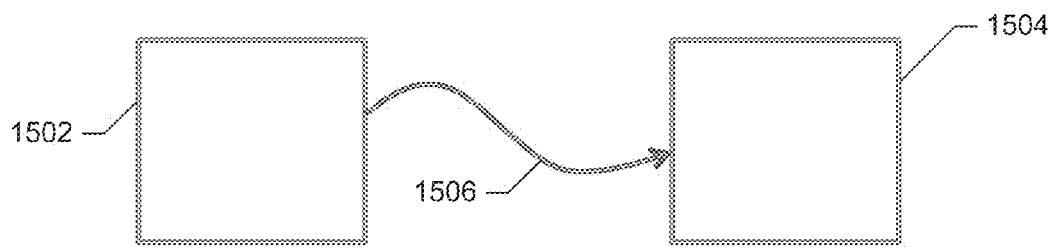
Figure 16:
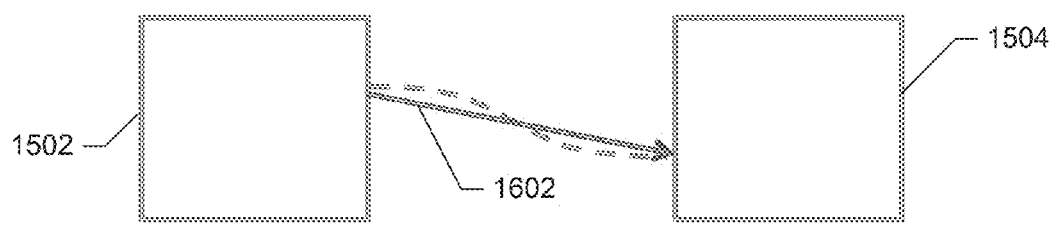

In addition to detecting the graphical objects discussed in conjunction with FIGS. 6 to 14, the example object detector 208 may also be configured to detect other types of graphical objects. For example, FIGS. 15 and 16 show diagrams representative as to how the object detector 208 detects a connector graphical object specified to connect two graphical objects 1502 and 1504. As shown in FIG. 15, a user provides a gesture 1506 connecting the two square graphical objects 1502 and 1504, which may already have been detected and displayed. The object detector 208 determines whether a first coordinate of the gesture 1506 is within (or close proximity to) one of the existing graphical objects 1502 and 1504 and whether a second coordinate of the gesture 1506 is within (or close proximity to) the other graphical object. It should be noted that the in this example, the object detector 208 and/or the coordinate detector 204 determines that the user is attempting to connect graphical objects (based on a relation of gesture coordinates in proximity or within coordinates of an already created object) and does not apply the coordinate-plane and/or moat region analysis discussed above.

After detecting the connector graphical object, the object detector 208 may crop or disregard coordinates that are inside of the graphical objects 1502 and 1504. The object detector 208 also determines whether the gesture coordinates are within a threshold (e.g., pixels) of a straight line 1602, as shown in FIG. 16. Responsive to detecting the gesture coordinates are within the threshold, the object detector 208 determines the user is attempting to draw a straight connector. The object detector 208 transmits a straight connector identifier (and corresponding gesture coordinates) to the object manager 206. Responsive to detecting the gesture coordinates are not within the threshold, the object detector 208 determines the user is attempting to draw a curved connector. The object detector 208 accordingly transmits a curved connector identifier (and corresponding gesture coordinates) to the object manager 206. The object detector 208 may also determine an arrow direction based on the start and end gesture coordinates.

iv) Object Predictor

Figure 17:
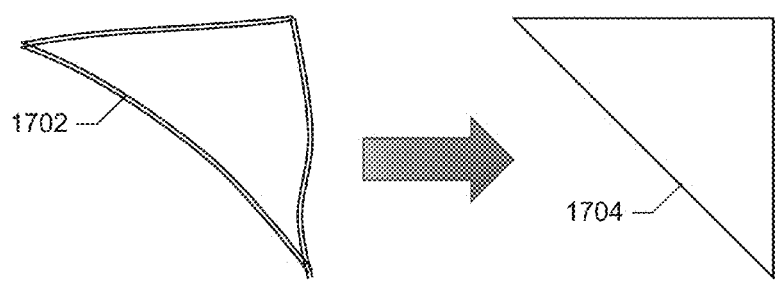

The example object predictor 210 of FIG. 2 is configured to predict objects being drawn by a user. For comparison, FIG. 17 shows a diagram of a user provided gesture 1702 that is detected by the object detector 208 to be a triangle. The object manager 206 accordingly outputs a formalized/proper version of a triangle graphical object 1704 to a user interface for display on a client device. The user interface may be the same interface which received the gesture 1702 or a different interface.

Figure 18:
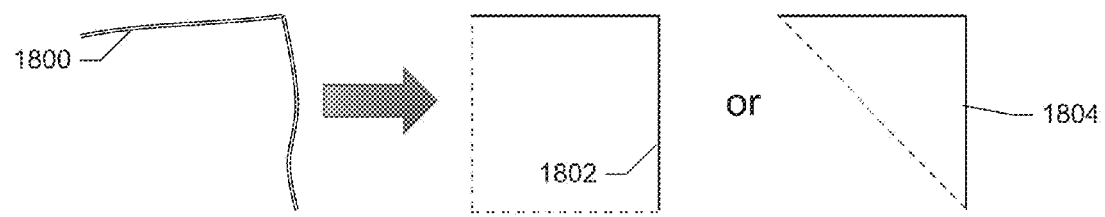
FIGS. 18 to 24 show diagrams of graphical object prediction performed by the example graphical object manager of FIGS. 1 and 2, according to an example embodiment of the present disclosure.

FIG. 18 in contrast shows a diagram of a user provided gesture 1800 that is predicted by the object predictor 210 to be either an L-shape graphical object 1802 or a triangle graphical object 1804. Similar to the object detector 208, the object predictor 210 determines that the user has drawn two straight lines in the shape of an 'L'. The object predictor 210, however, prompts the user to select one of a possible plurality of objects that includes the L-shape. It should be appreciated that such a configuration enables a user to select from among many possible objects after the user has provided a relatively simple gesture on a touchscreen.

Alternatively, the object predictor 210 may use feedback information stored in the database 212 to accurately predict the graphical object the user is attempting to draw based on previous actions. For example, the object predictor 210 may determine that 90% of the time a user means to draw a triangle when an L-shape is drawn. The object predictor 210 uses this feedback information to accordingly cause the triangle graphical object 1804 to be displayed responsive to detecting gesture coordinates corresponding to an L-shape.

Figure 19:
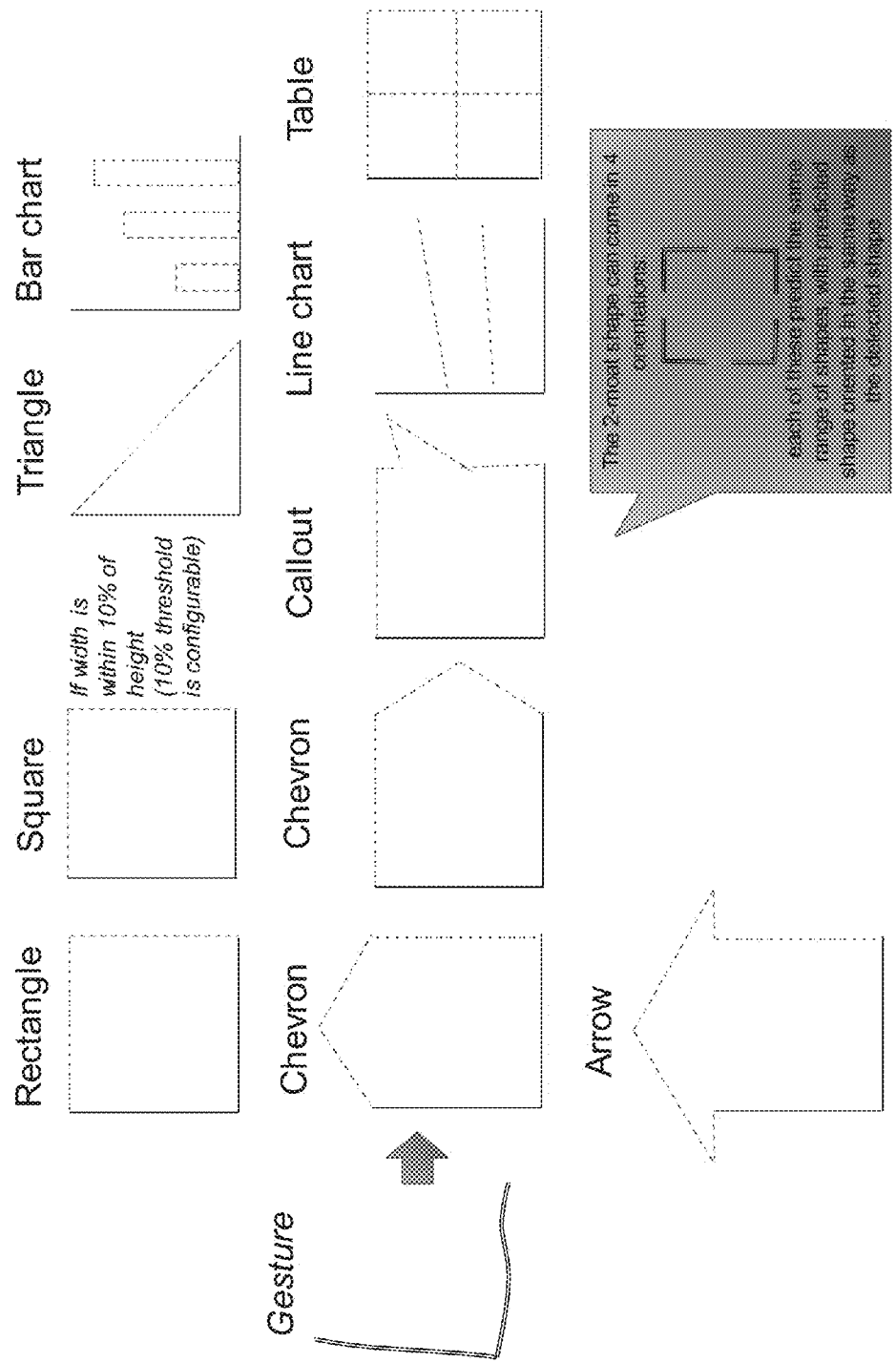
Figure 20:
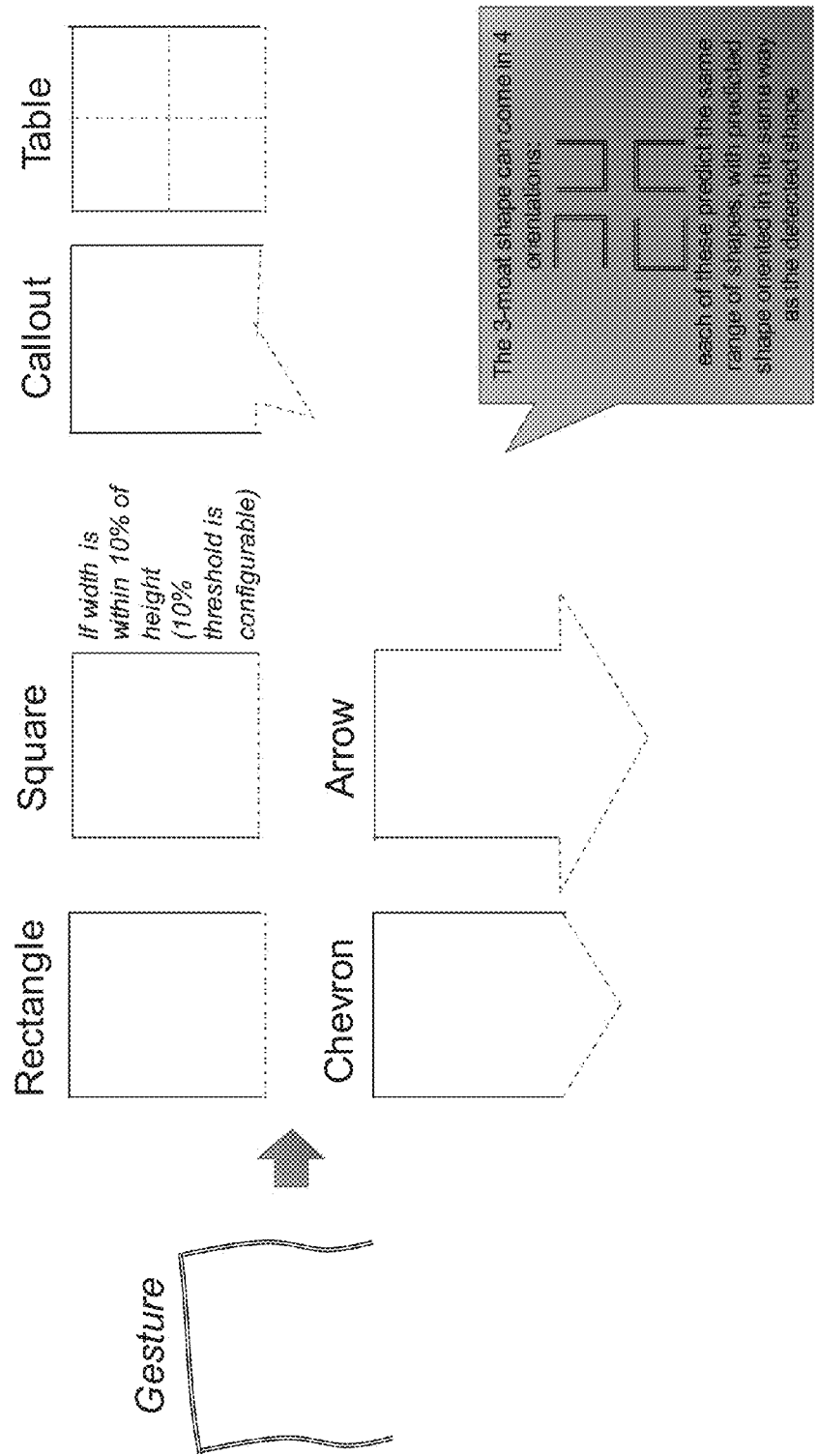
Figure 21:
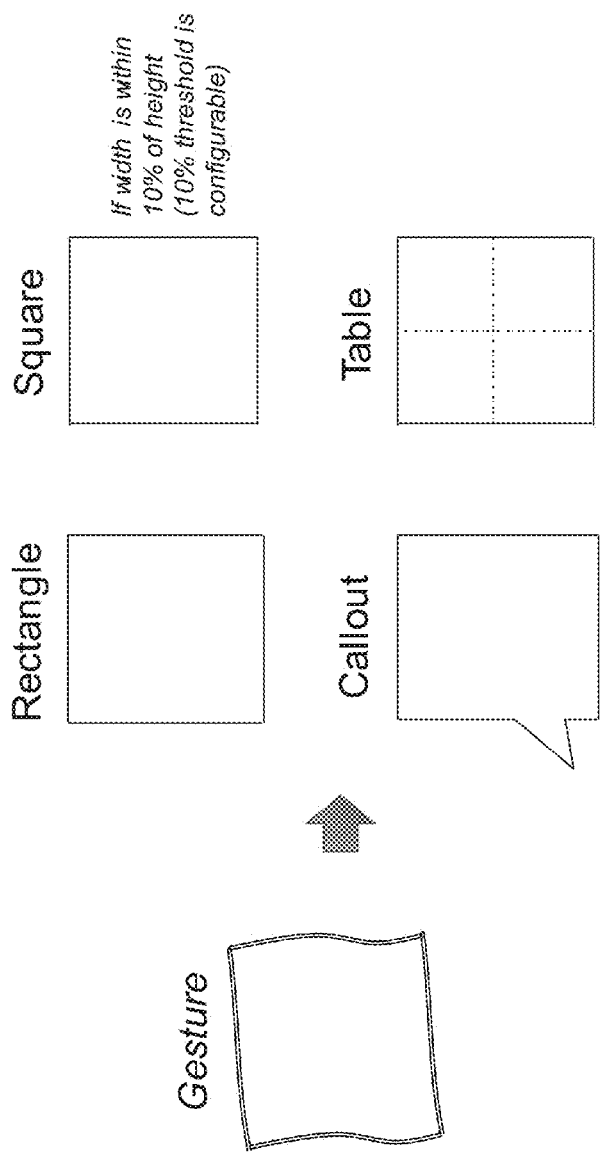
Figure 22:
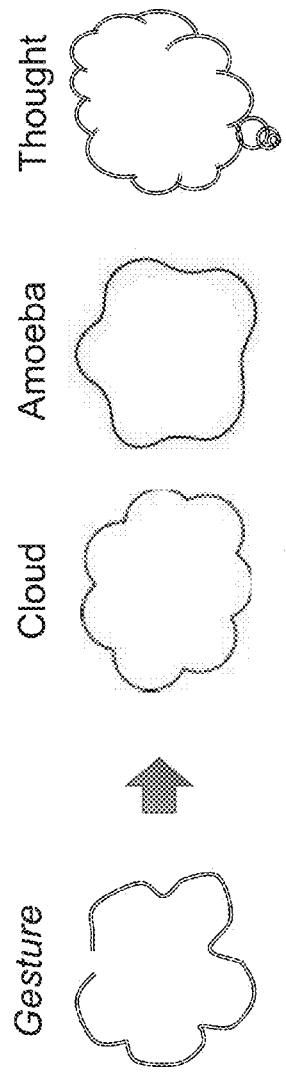
Figure 23:
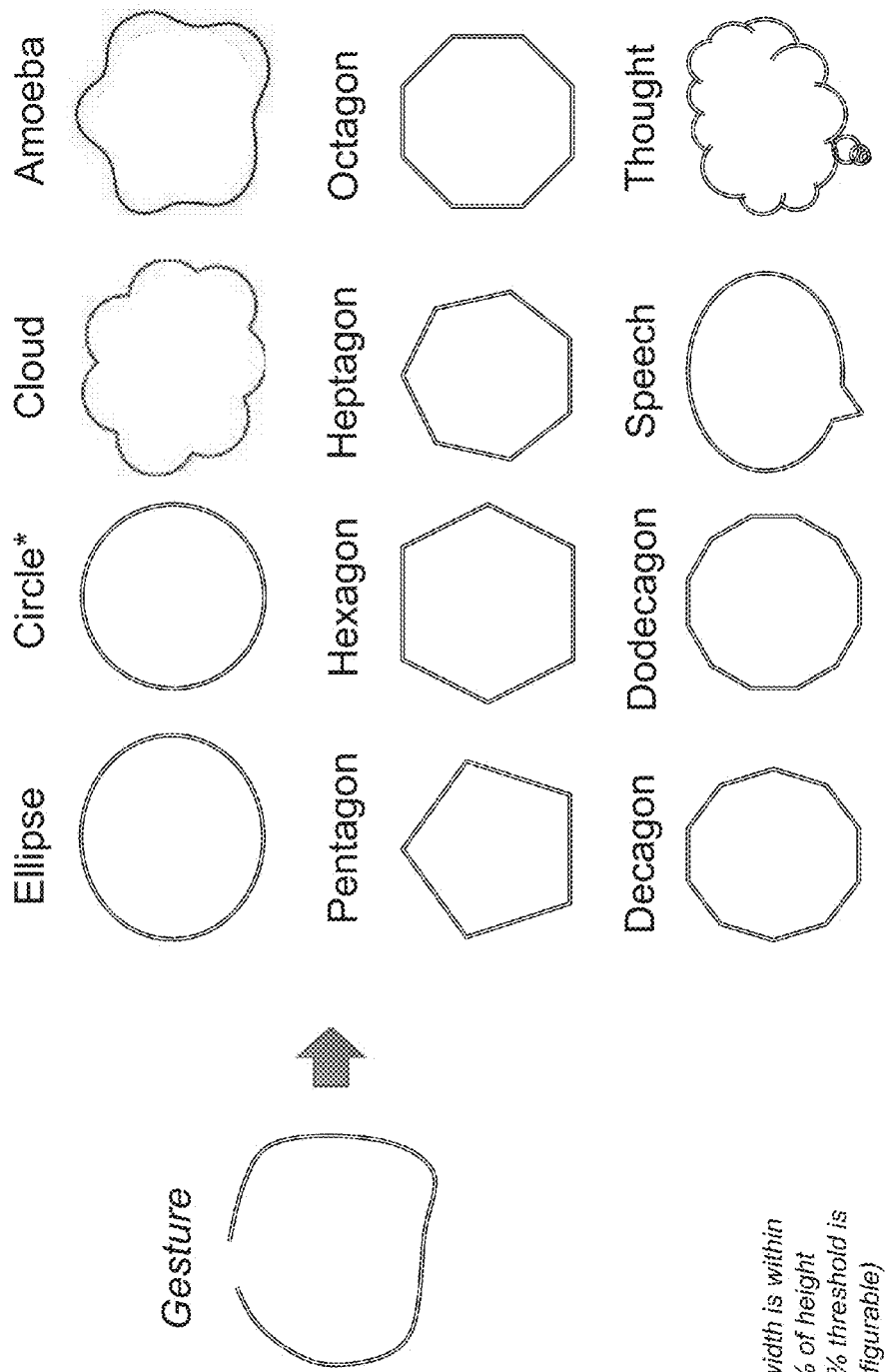
Figure 24:
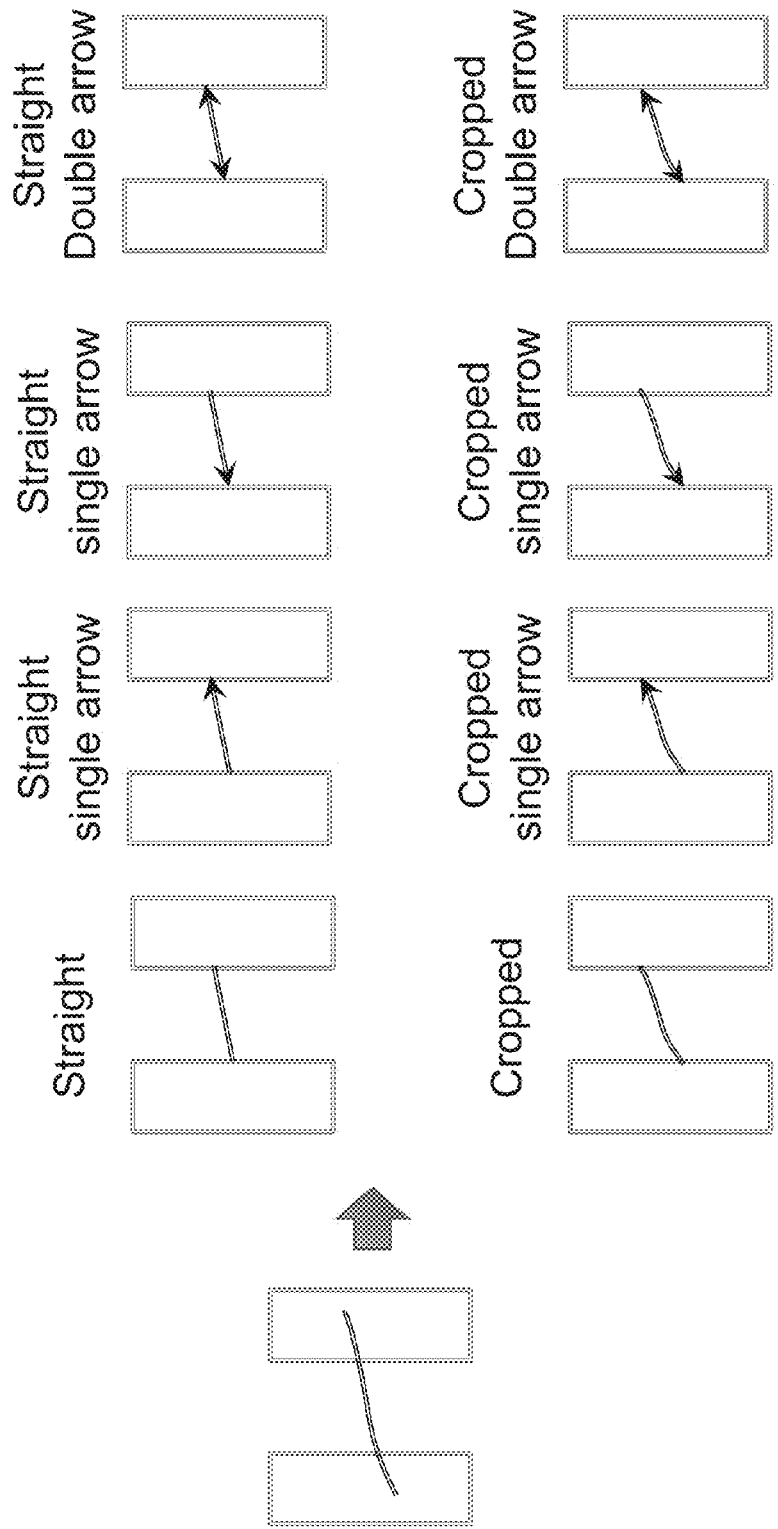

FIG. 19 shows potential graphical objects the object predictor 210 may predict based on gesture coordinates corresponding to an L-shape. The graphical objects include a rectangle, a square, a triangle, a bar chart, a chevron, a callout, a line chart, a table, or an arrow. FIG. 20 shows potential graphical objects the object predictor 210 may predict based on gesture coordinates corresponding to a U-shape. The graphical objects include a rectangle, a square, a callout, a table, a chevron, and an arrow. FIG. 21 shows potential graphical objects the object predictor 210 may predict based on gesture coordinates corresponding to a rectangle. The graphical objects include a rectangle, a square, a callout, and a table. FIG. 22 shows potential graphical objects the object predictor 210 may predict based on gesture coordinates corresponding to a cloud shape. The graphical objects include a cloud, an amoeba, and a thought bubble. FIG. 23 shows potential objects the object predictor 210 may predict based on gesture coordinates corresponding to an ellipse. The graphical objects include an ellipse, a circle, a cloud, an amoeba, a pentagon, a hexagon, a heptagon, an octagon, a decagon, a dodecagon, a speech bubble or a thought bubble. FIG. 24 shows potential graphical objects the object predictor 210 may predict based on gesture coordinates corresponding to a connector. The graphical objects include a straight connector with or without arrows or a curved connector with or without arrows.

v) Object Manager

The example object manager 206 included within the graphical object manager 110 of FIG. 2 is configured to process graphical objects for display. This includes preparing a graphical object for display based on an identifier and corresponding coordinates received from the object detector 208 and/or the object predictor 210. This also includes providing edit functionality so that a graphical object may be modified by a user.

As discussed, the object detector 208 provides an indication to the object manager 206 as to which graphical object is to be displayed. The object manager 206 uses this indication to access the database 212 and select the object definition, which specifies properties as to how the graphical object is to be displayed. For example, a square graphical object definition includes properties for size, fill, line type, position, etc. The object manager 206 copies the object definition and sets the properties based on the gesture coordinates. For example, the object manager 206 uses the distance between the coordinates to determine a size of the object. The object manager 206 also uses the coordinates to determine an orientation (e.g., a diagonal square) in which the graphical object is to be provided or displayed. The object manager 206 also uses the coordinates in relation to the dimensions of a touchscreen to determine where the graphical object is to be positioned. After preparing a graphical object for display, the object manager 206 renders the graphical object and instructs the display processor 214 to display the object within a user interface of the client device 102.

Figure 25:
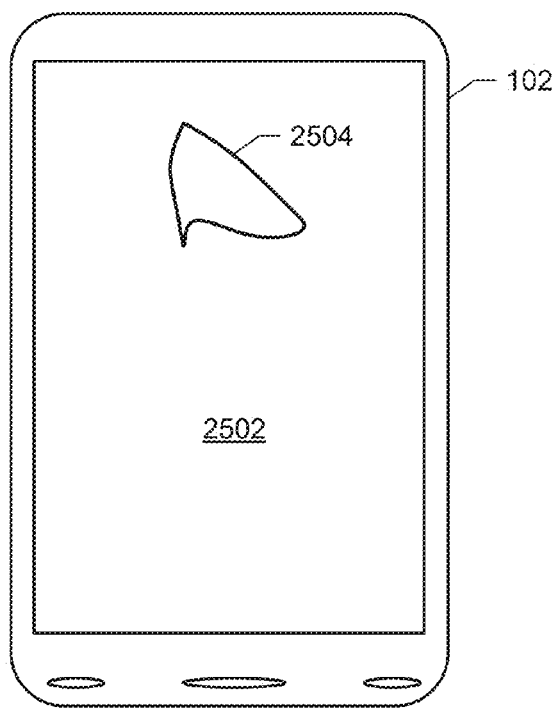
FIGS. 25 and 26 show diagrams of graphical object detection performed within a user interface of a client device, according to an example embodiment of the present disclosure.
Figure 26:
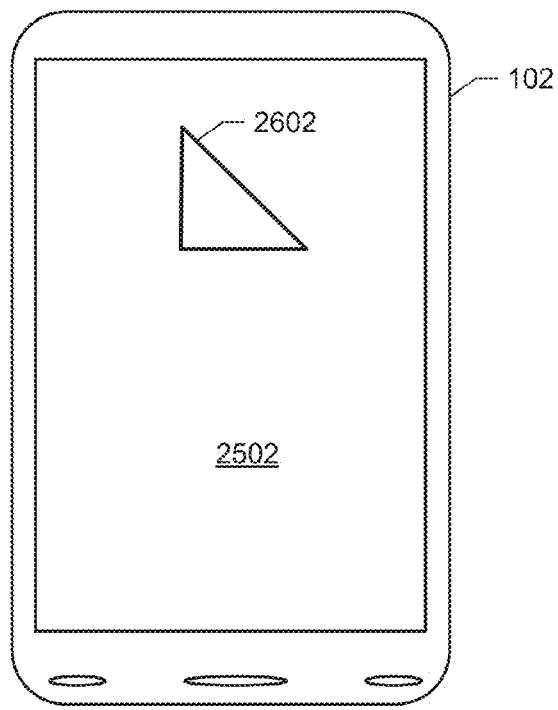

FIGS. 25 and 26 illustrate the operation of the object detector 208 in combination with the object manager 206 on a client device 102. FIG. 25 shows a user interface 2502 that is configured to receive user gestures and display graphical objects. In the illustrated example, a user draws gesture 2504. The touchscreen interface 202 receives the coordinates for the gesture 2504 and the coordinate detector 204 determines a coordinate-plane and moat regions. As discussed before, the coordinate-plane is created to substantially surround or encompass the gesture 2504.

The example object detector 208 uses the data structure 800 of FIG. 8 to determine that the gesture 2504 corresponds to a triangle graphical object and sends a triangle identifier and corresponding coordinates to the object manager 206. The example object manager 206 copies a triangle definition and configures a triangle object for display. The configuration includes sizing, orientating, and/or positioning the graphical object based on coordinates. The object manager 206 then renders the triangle graphical object based on the configured properties. The example display processor 214 causes the triangle graphical object to be displayed within the user interface 2502 as a formalized graphical object 2602 (shown in FIG. 26).

It should be appreciated that the formalized graphical object 2602 has substantially the same size, orientation, position, characteristics as the gesture 2504. This functionality enables users to quickly draw objects without having to resize or position formalized objects. Regarding L-shapes and U-shapes, the object manager 206 analyzes the coordinates to determine open sides so that the formalized object is displayed in the correct orientation.

Figure 27:
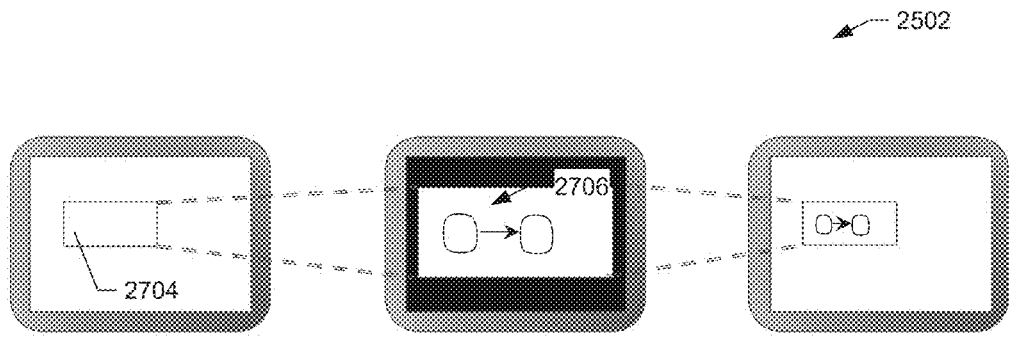
FIGS. 27 to 35 show diagrams of graphical object modification performed by the example graphical object manager of FIGS. 1 and 2, according to an example embodiment of the present disclosure.

In addition to causing formalized graphical objects to be displayed, the object manager 206 is also configured to enable users to edit objects, create figures of multiple objects, and store objects/figures. FIG. 27 shows an example illustrative of creating nested graphical objects within user interface 2502 of a client device 202. For instance, the example object manager 206 of FIG. 2 enables a user to zoom into a graphical object 2704 to draw additional or nested graphical objects 2706. The nested or child graphical objects are formed within a parent graphical object in the same manner that the parent graphical object was created. In addition, the object manager 206 links or otherwise associates the nested graphical objects with the parent graphical object so that moving, positioning, resizing of the parent graphical object causes the nested graphical objects to more or resize in the same manner.

For example, a user may rotate a parent graphical object by touching two opposing corners of the object and moving their fingers in a circular motion by the amount the object should be rotated. The action by the user causes the object manager 206 to rotate the parent object around its center based on a change in gradient between the user's fingers before and after movement. The object manager 206 also rotates all nested or child graphical objects in the same manner as the parent object.

Figure 28:
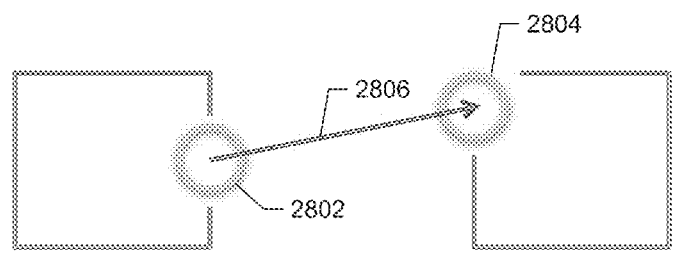

The example object manager 206 also enables users to move connector graphical objects. For example, FIG. 28 shows that the object manager 206 causes halos 2802 and 2804 to be displayed around endpoints of a connector graphical object 2806 upon selection of the connector 2806 by a user. The object manager 206 enables a user to select and move the halos 2802 and 2804 causing the connector graphical object 2806 to move in a corresponding manner. The object manager 206 is configured to position connector graphical objects so that endpoints align with edges of other graphical objects. For instance, a user may move a halo to a middle of a graphical object or through and beyond a graphical object. The object manager 206 determines an inferred endpoint location at an edge of the object so that the connector ends at the object edge. The object manager 206 may be configured so that an endpoint dragged by a user to a middle of a graphical object is moved to a nearside of the object while an endpoint dragged through the object is moved to a far side (e.g., the closest edge) of the object. The object manager 206 may also be configured to leave an endpoint of a connector graphical object unaltered if the endpoint is not within proximity of the object. It should be appreciated that the graphical object manager 110 may provide users an option to modify features of the object manager 206 so that an endpoint of a connector graphical object is positioned exactly where a user indicates on a touchscreen.

Figure 29:
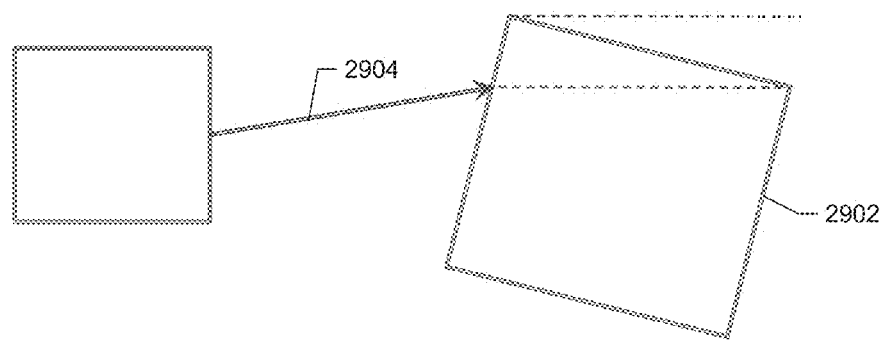

FIG. 29 shows an example of connected object features provided by the object manager 208. In particular, the object manager 208 may enable a user to move, resize, and/or rotate a graphical object 2902 so that an endpoint of a connector graphical object 2904 remains in substantially the same location relative to the modified object. The object manager 208 is also configured to enable users to copy or duplicate objects. For instance, a user may touch an interior of one graphical object with two fingers and make a dragging motion. This action causes the object manager 208 to copy the touched graphical object and display another identical graphical object with the same properties, nested objects, etc. in a location specified by the user.

As discussed, the graphical object manager 110 of FIGS. 1 and 2 is configured to enable users to relatively quickly create and edit graphical objects. FIGS. 30 to 33 show examples as to how the graphical object manager 110 enables a user to create and edit a chart/graph-type graphical object. In one example, a user may make an L-shape gesture on a touchscreen. The object detector 208 causes the corresponding formalized L-shape graphical object to be displayed and the object predictor 210 prompts the user as to whether another graphical object was intended. In this example, the user selects a line chart graphical object causing the object manager 206 to display a formalized line chart graphical object 3000 in a user interface of a client device. The line chart graphical object 3000 may include default axis values and markers, which a user may modify.

Figure 30:
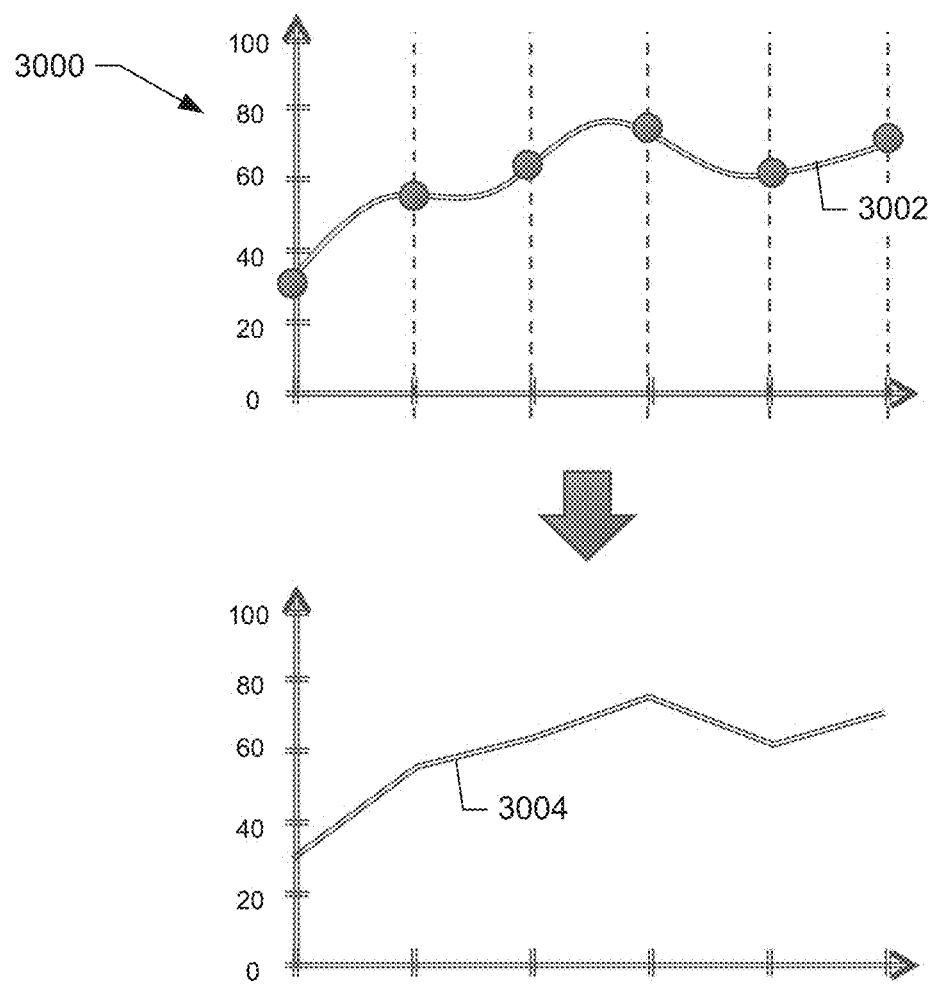

FIG. 30 shows a line gesture 3002 drawn by a user on the line chart graphical object 3000. The example object manager 206 determines the coordinates where the user's gesture 3002 intersects a mark or interval on the x-axis and creates a data point at that intersection. The object manager 206 then generates a formalized straight line graphical object 3004 between the data points. The object manager 206 may also enable a user to edit the formalized straight line object 3004 by moving individual data points or portions between data points. The object manager 206 may also enable a user to scale, move, or rotate the formalized straight line graphical object 3004 or the formalized graph object 3000 shown in FIG. 30.

Figure 31:
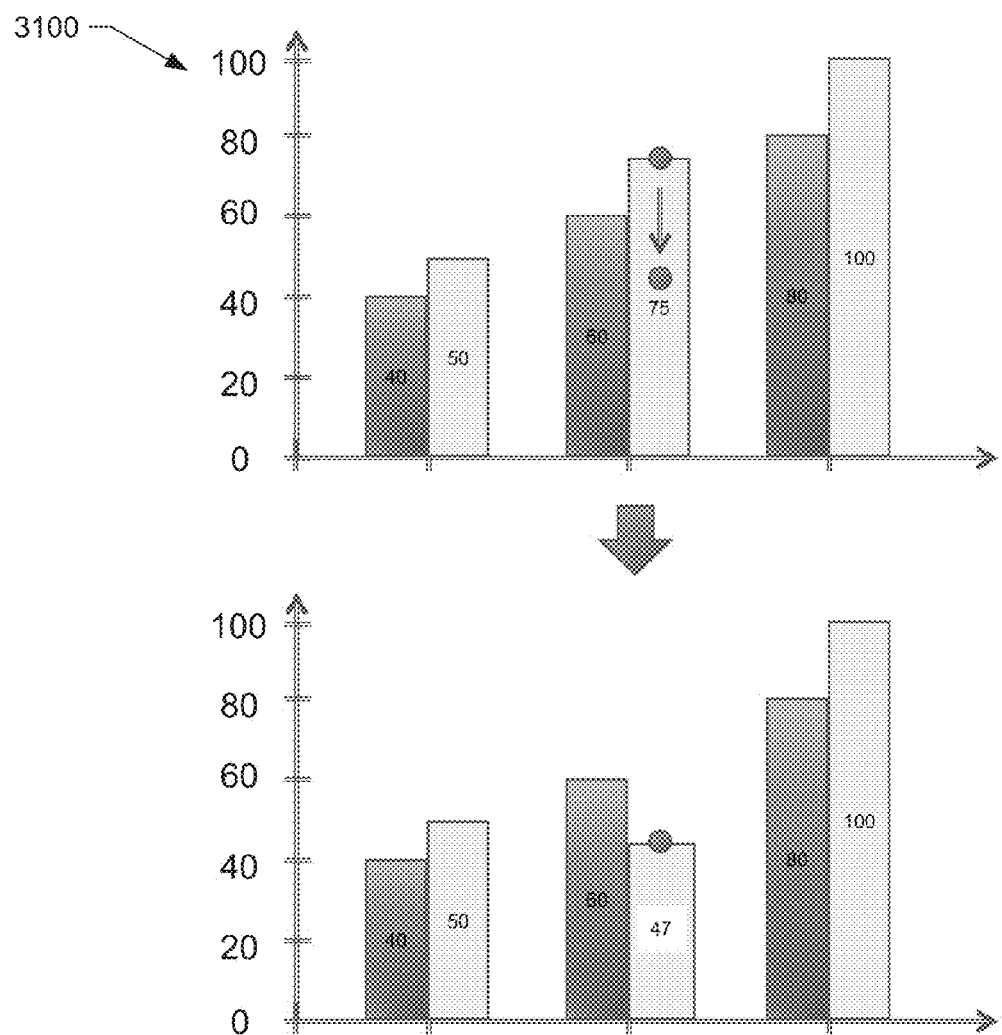
Figures 32, 33:
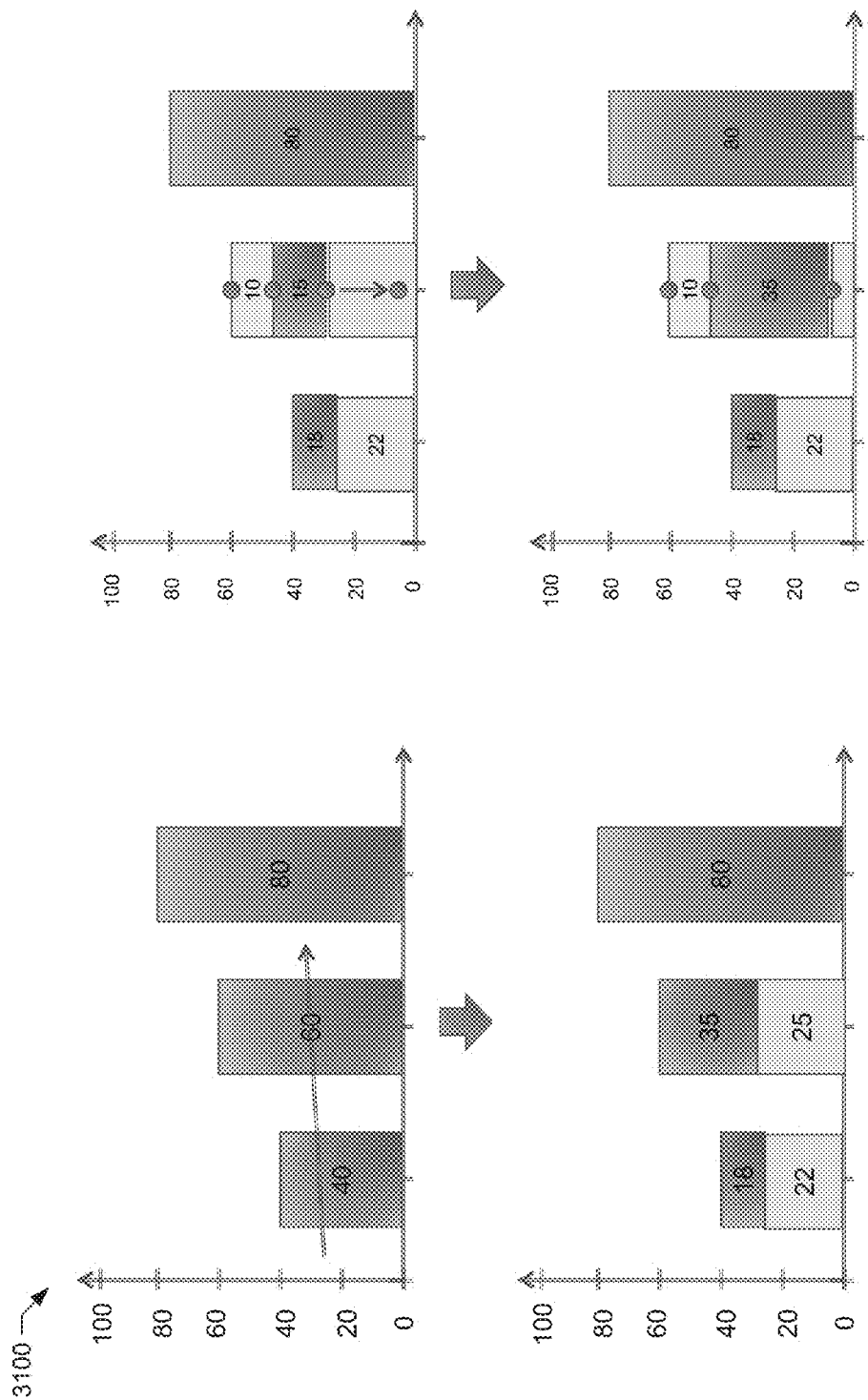

FIG. 31 shows a bar chart graphical object 3100 created by the object manager 206 based on inputs from a user. The object manager 206 enables a user to change dimensions of the individual bars, add additional bars, add additional data series, etc. FIG. 32 shows that the object manager 206 enables a user to make a swipe motion across a bar to partition the bar into separate data series. FIG. 33 shows that the object manager 206 enables a user to adjust the height of individual data series within a single bar graphical object.

It should be appreciated that the examples discussed in conjunction with FIGS. 27 to 33 are only illustrative of the features of the object manager 206. Other features of the object manager 206 may be defined within one or more data structures within the database 212. Such features may enable users to modify, size, rotate, position, merge separate objects, or otherwise edit graphical objects or groups of graphical objects based on touch gestures.

It should also be appreciated that the object manager 206 enables a user to store individual graphical objects, groups of graphical objects, and/or figures containing graphical objects to the database 212. For example, a user may store a graphical object, group of graphical objects, or a figure as a template for later use in other instances and/or applications. In this manner, the object manager 206 enables users to manage already created graphical objects, groups of graphical objects, and/or figures.

Figure 34:
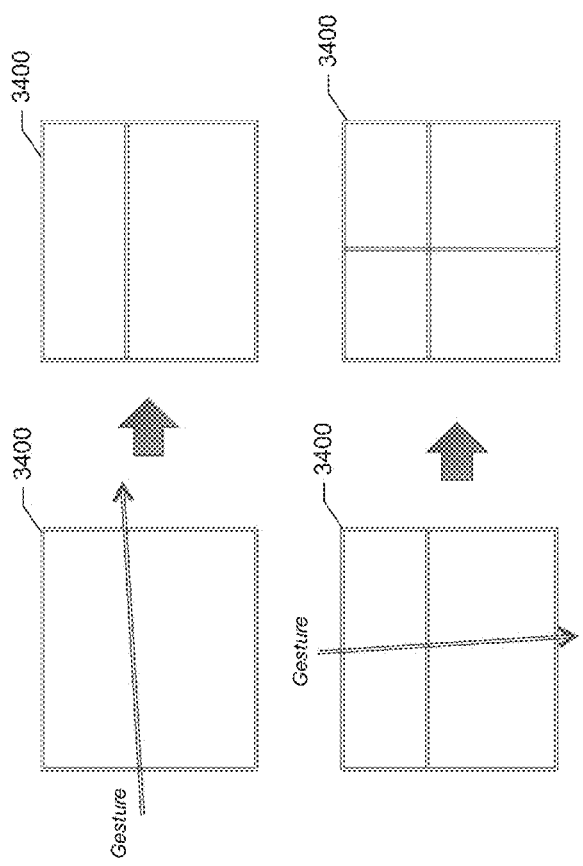
Figure 35:
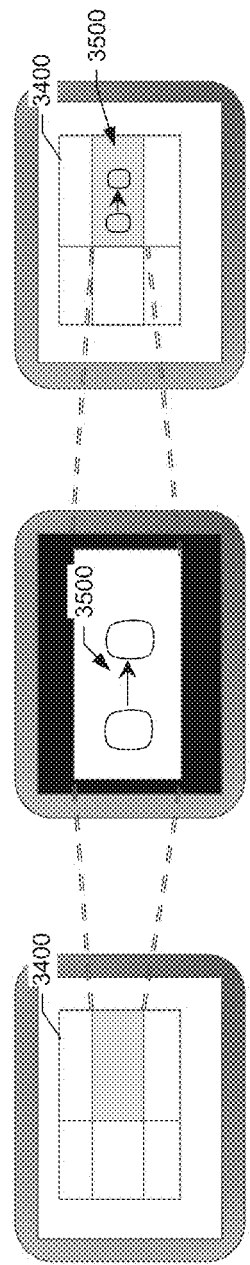

The example object manager 206 also enables users to create and/or edit table graphical objects. For example, FIGS. 34 and 35 show diagrams of embodiments of chart creation as provided by the object manager 206. In particular, a chart graphical object 3400 shown in FIG. 34 may be created by a user making, for example, an L-shaped gesture, a U-shaped gesture, or a rectangular gesture. The example object predictor 210 provides the user with the option of selecting the table graphical object 3400 among other graphical object types (as discussed in conjunction with FIGS. 19 to 21). A user may then make a swiping motion across the chart graphical object to add rows and/or columns. The example object manager 206 detects the a user input to create a row/column if, for example, the gesture crosses opposite sides of the table and if the gesture deviates less than a threshold (e.g., 15 degrees) from horizontal (for rows) or vertical (for columns). The example object manager 206 also enables a user to enter information into each of the cells of the table graphical object 3400.

FIG. 35 shows that the example object manager 206 enables a user to edit and/or remove column and/or row dividers table graphical object 3400 by selecting the desired separator. For example, a user may merge adjacent cells by removing a separator. A user may also increase/decrease the size of a cell by moving a separator by the desired amount. Moreover, a user may create nested graphical objects within each cell. For instance, a user may increase the view level of a cell and draw a gesture, which causes the object detector 208 and/or the object predictor 210 to provide a formalized graphical object 3500. The example object manager 206 nests or embeds the formalized object 3500 within the specified cell of the table graphical object 3400. The object manager 206 causes the nested and/or embedded object 3500 to be moved and/or modified based on changes the cell of the table graphical object 3400.

vi) Display Processor

The example display processor 214 of FIG. 2 is configured to cause formalized graphical objects to be displayed within a user interface of a client device 102. The example display processor 214 may also be configured to manage to which application a formalized graphical object is to be applied. For instance, a user may have multiple applications open on the client device 102. Responsive to a user making a gesture within an application, the display processor 214 causes a formalized version of the gesture to be displayed in conjunction with the same application. In some embodiments where the graphical object manager 110 is remotely located from a client device 102 (e.g., within the server 104), the display processor 214 is configured to transmit the formalized graphical object to the client device 102 across the network 108.

vii) Object Exporter

The example object exporter 216 of FIG. 2 is configured to export graphical objects, groups of graphical objects, and/or figures to other applications in a format native to the receiving application. To facilitate exporting, the object exporter 216 is configured to convert graphical objects, groups of graphical objects, and/or figures into a format compatible with a receiving application. The object exporter 216 may receive an indication as to which application a graphical object is to be exported. The object exporter 216 then creates a file or data structure with one or more pages and determines if the graphical object corresponds to a native object in the target application.

The example object exporter 216 is configured to create a native version of the graphical object regardless of whether the object is supported by the application. If the graphical object is native to the receiving application, the object exporter 216 is configured to create a native version of that same graphical object (using the definitions provided by a user via gestures) in the format compatible with the application and store the native version to the page. If the graphical object does not correspond to a native graphical object of the receiving application, the object exporter 216 is configured to create a series of bézier curves or other line segments that reflect the size, orientation, etc. of the object. In this manner, the object exporter 216 is configured to create an editable graphical object in a native format of a receiving application regardless of whether the object is specifically supported by the application. It should be appreciated that the same process is applied by the object exporter 216 for nested or child graphical objects. Additionally, the object exporter 216 is configured to group the nested and/or child graphical objects with the parent graphical object.

Different Contexts Embodiment

The example graphical object manager 110 of FIGS. 1 and 2 may be configured to detect and/or predict different types of graphical objects based on a context selected by a user (or determined based on user feedback or application). For example, a user may select a basic shapes context (e.g., circle, line, rectangle, etc.), which causes the graphical object manager 110 to filter which graphical object types may be detected and/or predicted. The same user could select a circuit context (e.g., resistors, capacitors, inductors, etc.), which causes the graphical object manager 110 to filter corresponding circuit graphical object types for detection or prediction. Alternatively, the graphical object manager 110 may determine a user has opened a word processing program and accordingly selects basic graphical objects. In the same manner, the graphical object manager 110 may determine a user has opened a circuit capture program and accordingly selects circuit graphical objects.

Figure 36:
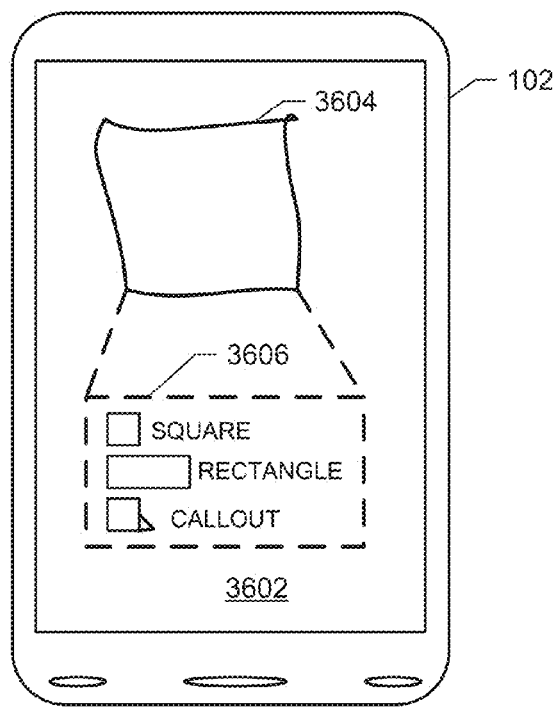
FIGS. 36 and 37 show diagrams of graphical object prediction based on a selected context, according to an example embodiment of the present disclosure.

FIG. 36 shows an example where a user has selected a basic shapes context. Within user interface 3602 a user draws gesture 3604. In response, the graphical object manager 110 prompts within box 3606 whether the user is attempting to draw a square, rectangle, or callout. It should be appreciated that the graphical object manager 110 automatically may cause a formalized square object to be displayed within the user interface 3602 prior and/or while providing the box 3606. In some instances, a user may instruct the graphical object manager 110 not to display the prompt box 3606.

Figure 37:
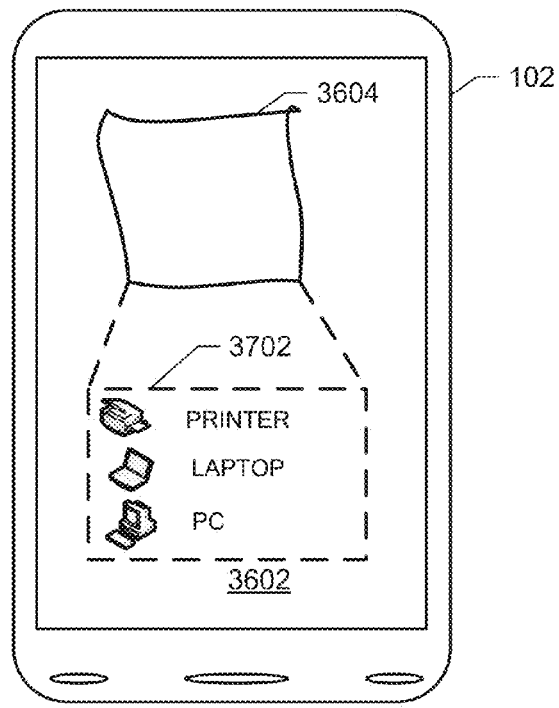

In contrast to FIG. 36, FIG. 37 shows an example where a user has selected an information technology context. Within the user interface 3602 a user draws gesture 3604. In response, the graphical object manager 110 prompts within box 3702 whether the user is attempting to draw a printer, laptop or PC. It should be appreciated that many different graphical objects may be displayed based on the context. It should also be appreciated that any type of context could be provided based on preferences of a user or detection by the graphical object manager 110.

Conclusion

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus comprising:
a touchscreen interface configured to receive at least one gesture from a user on a touchscreen of a client device;
a coordinate detector configured to:
  determine a coordinate-plane with dimensions substantially equal to a width and a height of the at least one gesture,
  determine at least four rectangular-shaped moat regions along a perimeter of the coordinate-plane, and
  determine coordinates of points along the at least one gesture;
an object detector configured to:
  determine whether a threshold number of the coordinates are within each of the moat regions,
  designate each moat region as a detected moat region responsive to determining that the threshold number of coordinates is reached for the respective moat region, and
  determine a graphical object based on the number of detected moat regions; and
an object manager configured to cause the graphical object to be displayed by the client device,
wherein the object detector is configured to determine the graphical object includes:
  at least one of a square and a rectangle responsive to determining there are four detected moat regions,
  a U-shape responsive to determining there are three detected moat regions,
  at least one of an L-shape and a triangle responsive to determining there are two detected moat regions,
  at least one of a British trapezium and a triangle responsive to determining there is one detected moat region, and
  a circular object responsive to determining there are zero detected moat regions.

2. The apparatus of claim 1, wherein the object detector is configured to:
determine an analysis ellipse that includes a predetermined width within the coordinate-plane and a predetermined height within the coordinate-plane; and
determine the circular object includes:
  a circle responsive to determining (i) that at least a predetermined number of the coordinates are outside of the analysis ellipse but within the coordinate-plane, and (ii) the width of the gesture is within 10% of the height of the gesture,
  an ellipse responsive to determining (i) that at least the predetermined number of coordinates are outside of the analysis ellipse but within the coordinate-plane, and (ii) the width of the gesture is greater than 10% of the height of the gesture, and
  a cloud responsive to determining (i) that less than the predetermined number of coordinates are outside of the analysis ellipse, and (ii) the gesture includes at least four waves.

3. The apparatus of claim 2, wherein the object detector is configured to determine a wave by:
determining a distance between each of the coordinates and a center of the analysis ellipse;
determining local minimum points among the coordinates; and
designating the wave as the coordinates that are located between two adjacent local minimum points.

4. The apparatus of claim 1, wherein the coordinate detector is configured to:
determine a greatest width of the at least one gesture;
determine a greatest height of the at least one gesture; and
set a width of the coordinate-plane to substantially match the greatest width and set a height of the coordinate-plane to substantially match the greatest height.

5. The apparatus of claim 1, further comprising an object exporter configured to create a native version of the graphical object for export to a corresponding application.

6. The apparatus of claim 1, further comprising an object exporter configured to:
determine a native version of the graphical object is unsupported for an application specified to receive the graphical object;
responsive to determining the native version of the graphical object is not supported, create one or more line segments as an editable object compatible with the receiving application, the editable object configured to visually resemble the graphical object; and
provide the editable object to the application.

7. The apparatus of claim 1, wherein the object manager is configured to cause the graphical object to be displayed by:
selecting an object definition corresponding to the graphical object, the object definition including at least one property specifying how the graphical object is to be displayed;

setting the at least one property of the graphical object based on the coordinates of points; and
rendering the graphical object for display.

8. The apparatus of claim 7, wherein the at least one property includes a size, an orientation, and a position of the graphical object relative to the touchscreen.

9. An apparatus comprising:
a touchscreen interface configured to receive a partial gesture from a user on a touchscreen of a client device;
a coordinate detector configured to:
  determine a rectangular-shaped coordinate-plane with dimensions substantially equal to a width and a height of the partial gesture,
  determine at least four moat regions along a perimeter of the coordinate-plane, and
  determine coordinates of points along the partial gesture;
an object predictor configured to:
  determine whether a threshold number of the coordinates are within each of the moat regions, the threshold number related to at least 25% of a length of the respective moat region,
  designate each moat region as a detected moat region responsive to determining that the threshold number of coordinates is reached for the respective moat region, and
  predict a graphical object based on the number of detected moat regions; and
an object manager configured to cause the graphical object to be displayed by the client device.

10. The apparatus of claim 9, wherein the object predictor is configured to:
determine the partial gesture corresponds to at least two possible graphical objects; and
provide a prompt to the user via a display of the client device to select one of the at least two possible graphical objects.

11. The apparatus of claim 9, wherein the object predictor is configured to:
compare the partial gesture to previous partial gestures;
determine the partial gesture matches one of the previous partial gestures; and
determine the graphical object by identifying a graphical object type that corresponds to the matching previous partial gesture.

12. The apparatus of claim 9, wherein:
the touchscreen interface is configured to receive a second partial gesture from the user on the touchscreen of the client device;
the coordinate detector is configured to:
  determine a second coordinate-plane for the second partial gesture, and
  determine second coordinates of points along the second partial gesture;
the object predictor is configured to determine a second graphical object based on the second coordinates of points corresponding to the second partial gesture; and
the object manager is configured to:
  determine the second partial gesture is within the graphical object,
  nest the second graphical object within the graphical object, and
  cause the second graphical object to be displayed within the graphical object by the client device.

13. The apparatus of claim 9, wherein the partial gesture corresponds to less than a complete gesture of the graphical object that the user is attempting to draw.

14. A method comprising:
prompting a user, via a processor, to draw an object on a touchscreen of a client device;
receiving at least one gesture from the user on the touchscreen;
applying, via the processor, a coordinate-plane to the at least one gesture, the coordinate-plane including at least two moat regions along a perimeter of the coordinate-plane;
for each of the moat regions:
  (i) determine coordinates of points along the at least one gesture,
  (ii) determine whether a threshold number of the coordinates are within each of the moat regions, the threshold number related to at least 25% of a length of the respective moat region, and
  (iii) designate each moat region as a detected moat region responsive to determining that the threshold number of coordinates is reached for the respective moat region;
determining, via the processor, a graphical object based on a number of detected moat regions; and
causing, via the processor, the graphical object to be displayed by the client device.

15. The method of claim 14, wherein the graphical object is a formalized editable version of the at least one gesture provided by the user, the graphical object being approximately the same size as the at least one gesture.

16. The method of claim 14, wherein the coordinate-plane has a rectangular shape with dimensions substantially equal to a greatest width and a greatest height of the at least one gesture.

17. The method of claim 14, wherein the coordinate-plane includes four rectangular shaped moat regions, one moat region positioned along each side of the coordinate-plane.

18. The method of claim 14, further comprising exporting the object to an application in a format native to the application.

19. The method of claim 14, further comprising:
determining, via the processor, a context in which the at least one gesture was provided; and
determining the graphical object based on the context in addition to the number of detected moat regions.

20. A method comprising:
prompting a user, via a processor, to draw an object on a touchscreen of a client device;
receiving at least one gesture from the user on the touchscreen;
applying, via the processor, a coordinate-plane to the at least one gesture, the coordinate-plane including four rectangular shaped moat regions, one moat region positioned along each side of the coordinate-plane:
for each of the moat regions:
  (i) determine coordinates of points along the at least one gesture,
  (ii) determine whether a threshold number of the coordinates are within each of the moat regions, and
  (iii) designate each moat region as a detected moat region responsive to determining that the threshold number of coordinates is reached for the respective moat region;
determining, via the processor, a graphical object based on a number of detected moat regions; and
causing, via the processor, the graphical object to be displayed by the client device, wherein:

the detection of four moat regions causes at least one of a square and a rectangle to be displayed on the client device;

the detection of three moat regions causes a U-shape to be displayed on the client device;

the detection of two moat regions causes at least one of an L-shape and a triangle to be displayed on the client device;

the detection of one moat region causes at least one of a British trapezium and a triangle to be displayed on the client device; and the detection of zero moat regions causes at least one of a circle, ellipse, and cloud to be displayed on the client device.

21. The method of claim 20, further comprising:

determining, via the processor, an analysis ellipse that includes a predetermined width within the coordinate-plane and a predetermined height within the coordinate-plane;

causing, via the processor, the circle to be displayed responsive to determining (i) that at least a predetermined number of the coordinates are outside of the analysis ellipse but within the coordinate-plane, and (ii) the width of the gesture is within 10% of the height of the gesture;

causing, via the processor, the ellipse to be displayed responsive to determining (i) that at least the predetermined number of coordinates are outside of the analysis ellipse but within the coordinate-plane, and (ii) the width of the gesture is greater than 10% of the height of the gesture; and causing, via the processor, the cloud to be displayed responsive to determining (i) that less than the predetermined number of coordinates are outside of the analysis ellipse, and (ii) the gesture includes at least four waves.

22. The method of claim 21, wherein the processor is to determine a wave by:

determining a distance between each of the coordinates and a center of the analysis ellipse;

determining local minimum points among the coordinates; and designating the wave as the coordinates that are located between two adjacent local minimum points.

23. A non-transitory machine-accessible device having instructions stored thereon that, when executed, cause a machine to at least:

prompt a user to draw a graphical object on a touchscreen of a client device;

for each touch gesture received on the touchscreen:
(a) determine coordinates for the touch gesture including a first coordinate corresponding to the start of the touch gesture and a last coordinate corresponding to an end of the touch gesture;
(b) determine a length of a moat region based on the first coordinate and the last coordinate, the moat region have a predetermined width;
(c) determine whether a threshold number of coordinates are within the moat region having dimensions of the determined length and the predetermined width, the threshold number related to at least 25% of a length of the moat region;
(d) designate the moat region as a detected moat region responsive to determining that the threshold number of coordinates is reached;

determine a graphical object based on a number of detected moat regions; and cause the graphical object to be displayed on the client device as a formalized editable version of the at least one touch gesture in a format native to an application selected to receive the graphical object.

* * * * *